US010171620B2

(12) United States Patent
Torii et al.

(10) Patent No.: US 10,171,620 B2
(45) Date of Patent: Jan. 1, 2019

(54) NON-TRANSITORY COMPUTER-READABLE RECORDING MEDIUM HAVING STORED THEREIN CONTROL PROGRAM, CONTROL APPARATUS AND CONTROL METHOD

(71) Applicant: FUJITSU LIMITED, Kawasaki-shi, Kanagawa (JP)

(72) Inventors: Yuki Torii, Anjo (JP); Takaaki Nakazawa, Nagoya (JP); Satoshi Matsuda, Nagoya (JP); Ichiro Kotani, Nagoya (JP); Hiroki Matsueda, Kawasaki (JP); Naoki Tateishi, Nagoya (JP); Yoko Yonemoto, Nagoya (JP); Saeko Nakamura, Ichinomiya (JP); Hui Li, Obu (JP); Takeshi Kawaguchi, Nagoya (JP); Yasuhide Tobo, Chita (JP); Takeo Iizuka, Kawasaki (JP); Yuki Nojiri, Nagoya (JP)

(73) Assignee: FUJITSU LIMITED, Kawasaki (JP)

(*) Notice: Subject to any disclaimer, the term of this patent is extended or adjusted under 35 U.S.C. 154(b) by 674 days.

(21) Appl. No.: 14/600,618

(22) Filed: Jan. 20, 2015

(65) Prior Publication Data
US 2015/0215426 A1 Jul. 30, 2015

(30) Foreign Application Priority Data
Jan. 29, 2014 (JP) .................. 2014-014203

(51) Int. Cl.
*H04L 29/08* (2006.01)
*G06F 9/50* (2006.01)

(52) U.S. Cl.
CPC ............. *H04L 67/32* (2013.01); *G06F 9/505* (2013.01); *G06F 9/5044* (2013.01); *H04L 67/10* (2013.01)

(58) Field of Classification Search
CPC ....... G06F 9/5044; G06F 9/505; H04L 67/10; H04L 67/32
See application file for complete search history.

(56) References Cited

U.S. PATENT DOCUMENTS

2004/0193827 A1 9/2004 Mogi et al.
2005/0289231 A1* 12/2005 Harada .................. G06Q 10/00
709/224

(Continued)

FOREIGN PATENT DOCUMENTS

JP 7-78118 A 3/1995
JP 11-288382 10/1999

(Continued)

OTHER PUBLICATIONS

Japanese Office Action dated Aug. 8, 2017 for corresponding Japanese Patent Application No. 2014-014203, with Partial English Translation, 4 pages.

*Primary Examiner* — June Y Sison
(74) *Attorney, Agent, or Firm* — Fujitsu Patent Center

(57) ABSTRACT

Processing request information of a processing request for a first computer by a second computer is acquired, first operation information and second operation information that relate to operations of the first computer and the second computer are acquired, respectively; and a type of the processing request is determined based on processing result information, the processing request information, the first operation information, and the second operation information. The processing result information associates a processing history of the first computer according to the processing request included in the processing request information for the first computer with the second operation information that relates to the processing request by the second computer (Continued)

making the processing request. Accordingly, the type of the processing request can be appropriately determined.

15 Claims, 39 Drawing Sheets

(56) References Cited

U.S. PATENT DOCUMENTS

| | | | | |
|---|---|---|---|---|
| 2007/0233872 A1* | 10/2007 | Yoshikawa | ........... | G06F 9/5055 709/226 |
| 2010/0077092 A1* | 3/2010 | Akaboshi | ............ | G06F 17/3089 709/230 |
| 2011/0154360 A1* | 6/2011 | Kikuchi | .............. | G06F 11/3476 718/106 |
| 2013/0116976 A1* | 5/2013 | Kanemasa | .......... | G06F 11/3452 702/186 |

FOREIGN PATENT DOCUMENTS

| | | |
|---|---|---|
| JP | 2004-302751 | 10/2004 |
| JP | 2012-150733 | 8/2012 |

\* cited by examiner

FIG. 2

| TASK TYPE | STARTING POINT | ISSUANCE SOURCE OF REMOTE SQL | | | DB SERVER | |
|---|---|---|---|---|---|---|
| | | ISSUANCE SOURCE IS BATCH SERVER | AP SERVER | BATCH SERVER | LOCAL BATCH | RDBMS THREAD |
| ONLINE | END USER | × | ○ | × | × | ○ |
| LOCAL BATCH | BATCH SERVER | ○ | × | × | ○ | ○ |
| REMOTE BATCH | | ○ | × | ○ | × | ○ |
| WEB SERVICE BATCH | | ○ | ○ | ○ | × | ○ |

FIG. 3

| TASK TYPE | SYSTEM CONFIGURATION AND FLOW OF PROCESS | | | | DETERMINABILITY | |
|---|---|---|---|---|---|---|
| | WEB SERVER | AP SERVER | DB SERVER | BATCH SERVER | KNOWN TECHNIQUE | PRESENT EMBODIMENT |
| LOCAL BATCH TASK | | | ○ | | NG | OK |
| REMOTE BATCH TASK | | ○ ↑ | ○ | ↓ ○ | PARTLY OK (※1) | OK |
| WEB SERVICE BATCH TASK | ○ ↑↓ | ○ ↑ | ○ | ○ | NG | OK |
| ONLINE TASK | ○ ↑ | ○ ↑ | ○ | | PARTLY OK (※2) | OK |

※1 BATCH TASK ISSUED FROM AP SERVER IS DETERMINABLE
   BATCH TASK ISSUED FROM BATCH SERVER IS UNDETERMINABLE
※2 WEB SERVICE BATCH TASK IS DETERMINED ALSO AS ONLINE

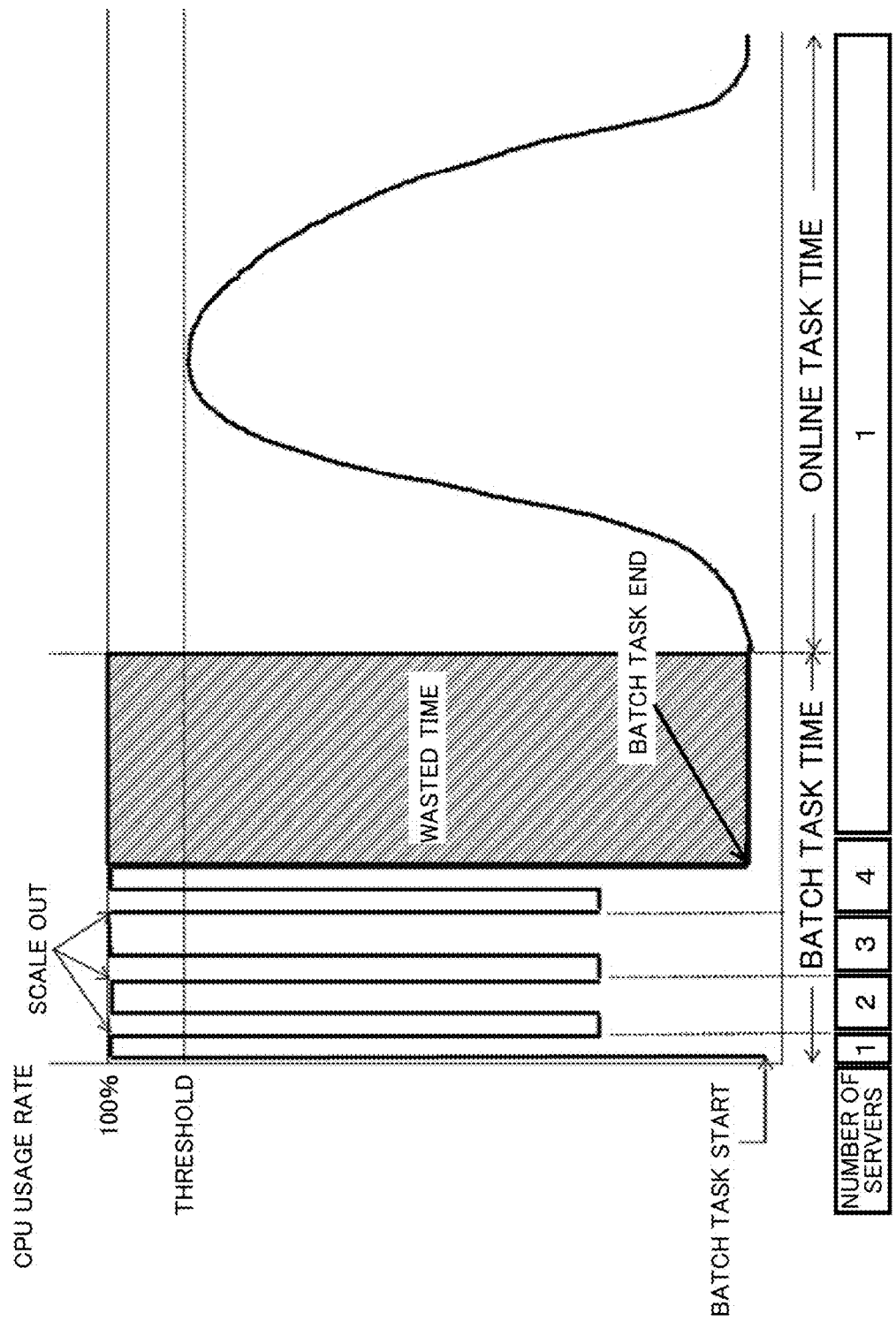

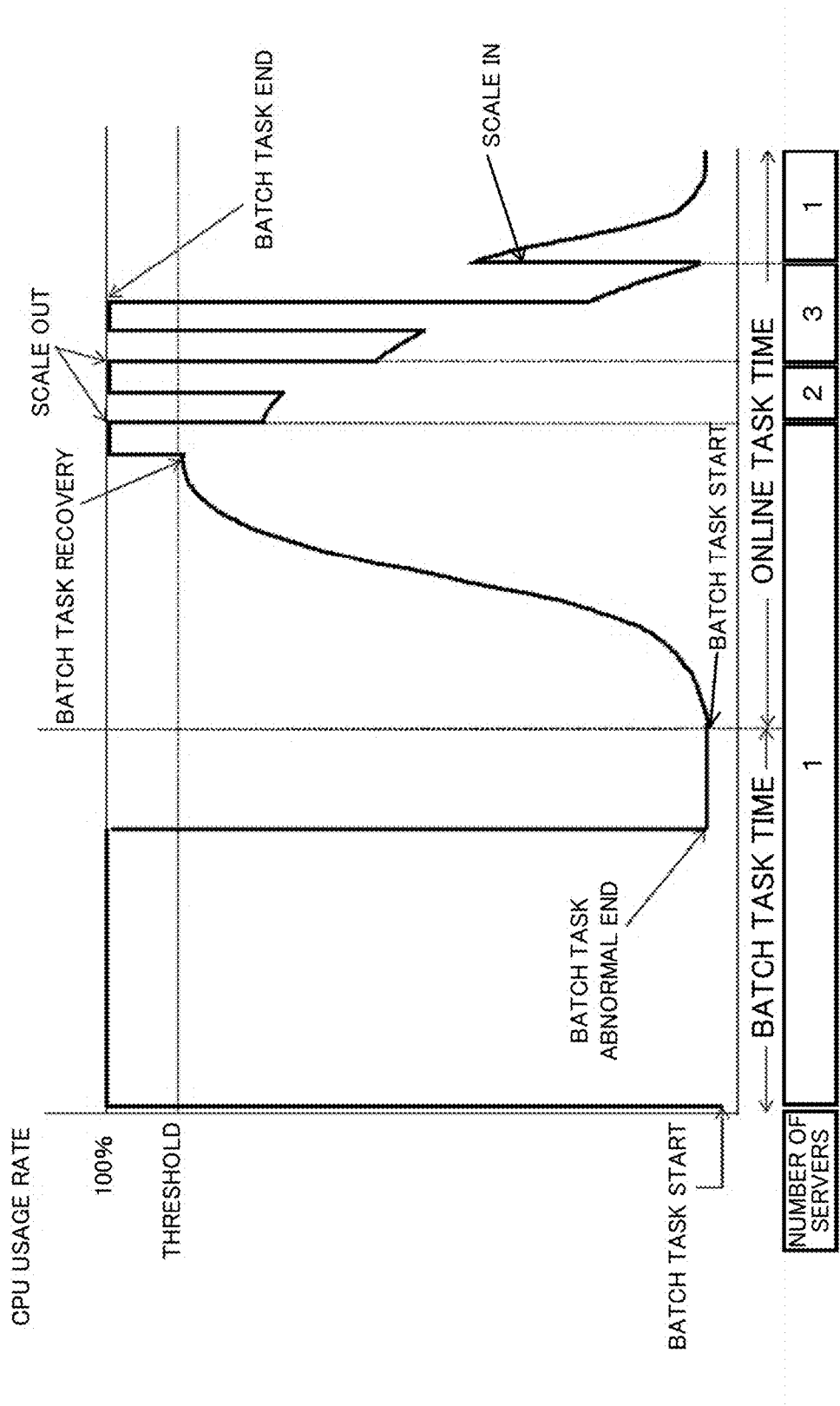

FIG. 9

SQL INFORMATION

| INFORMATION ACQUISITION TIME | PROCESS ID | SESSION ID | SQL STATEMENT | PROCESSING START TIME OF SQL | PROCESSING END TIME OF SQL |
|---|---|---|---|---|---|
| 2013/07/10 17:40:23 | 4524 | id9793474169sab0a69249995be69492sc | SELECT AAA from BBB | 2013/07/10 17:40:23 | 2013/07/10 17:40:50 |
| 2013/07/10 17:41:56 | 4428 | id9393474169sabprt9s2499569ae9aa93g | UPDATE PPP set Low1 = XXX | 2013/07/10 17:40:23 | 2013/07/10 17:41:56 |
| 2013/07/10 17:41:56 | 2493 | id9393474ytu783bpr9s9nghdbub9894e | SELECT FFF from GGG | 2013/07/10 17:40:35 | 2013/07/10 17:41:56 |

FIG. 10

PROCESS INFORMATION

| INFORMATION ACQUISITION TIME | USED PROCESS NAME | PROCESS ID | SESSION ID | CPU USAGE RATE(%) | MEMORY USAGE RATE | NUMBER OF THREADS |
|---|---|---|---|---|---|---|
| 2013/07/10 17:40:66 | RDBMS | 4524 | ld6793a4741a80ab0ab924856 9eb9492acc | 07 | 1,512K | 14 |
| 2013/07/10 17:40:66 | Batch A | 5176 | ld9368a4741a80abprt9s24856 9eb8aa09gc | 05 | 1,056K | 6 |
| 2013/07/10 17:40:66 | Explorer | 5644 | ld9368474ytu763bprt9e9nghd lab89jw44e | 12 | 45,284K | 32 |

FIG. 11

NETWORK INFORMATION

| INFORMATION ACQUISITION TIME | EXECUTED PROCESS NAME | PROCESS ID | LOCAL ADDRESS | EXTERNAL ADDRESS |
|---|---|---|---|---|
| 2013/07/10 17:40:56 | RDBMS | 24440 | 10.90.151.xxx:64899 | 10.124.20.xxx:445 |
| 2013/07/10 17:40:56 | Batch A | 31200 | 10.90.151.xxx:65129 | 10.128.197.xxx:6957 |
| 2013/07/10 17:40:56 | Explorer | 5644 | 10.90.151.xxx:65310 | 10.128.197.xxx:6442 |

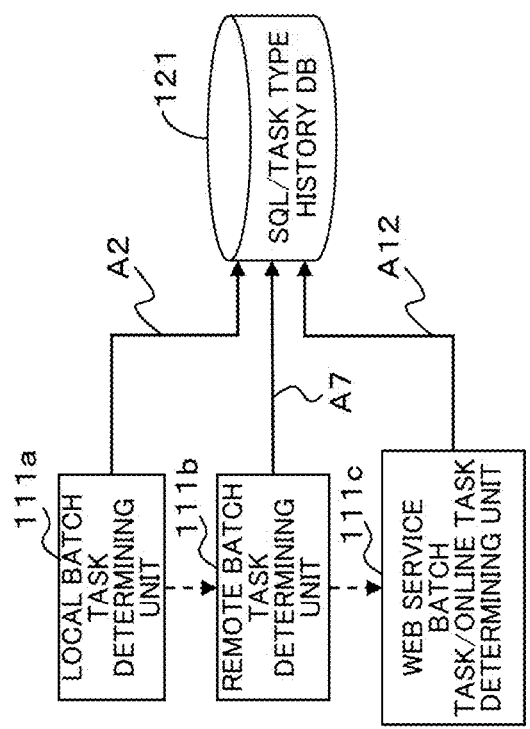

FIG. 14

121: SQL/TASK TYPE HISTORY DB

| INFORMATION ACQUISITION TIME | SQL INFORMATION ||||| TASK TYPE | ISSUANCE SOURCE SERVER IP ADDRESS |
|---|---|---|---|---|---|---|---|
| | PROCESS ID | SESSION ID | SQL STATEMENT | PROCESSING START TIME OF SQL | PROCESSING END TIME OF SQL | | |
| 2013/07/10 17:40:56 | 4524 | b8579347d41a8 0ab3ab5324856 9ab9492acc | SELECT AAA from BBB | 2013/07/10 17:40:23 | 2013/07/10 17:40:50 | BATCH TASK | 10.124.129.xxx |
| 2013/07/10 17:40:56 | 4428 | b8368947d41a8 0abpt5c248566 9ab9a408gc | UPDATE PPP set Low1 = xxx | 2013/07/10 17:40:23 | 2013/07/10 17:41:56 | BATCH TASK | 10.90.151.xxx |
| 2013/07/10 17:40:56 | 2483 | b8589347ytu7 833cpt9o3nghd teb909jp44.e | SELECT FFF from GGG | 2013/07/10 17:40:36 | 2013/07/10 17:41:56 | ONLINE TASK | 10.138.141.xxx |

FIG. 26

SQL INFORMATION

| INFORMATION ACQUISITION TIME | PROCESS ID | SESSION ID | SQL STATEMENT | PROCESSING START TIME OF SQL | PROCESSING END TIME OF SQL |
|---|---|---|---|---|---|
| 2013/07/10 17:41:56 | 4524 | id6793474.1a80ab0a b9248569eb9492ac c | SELECT AAA from BBB | 2013/07/10 17:40:23 | 2013/07/10 17:40:50 |
| 2013/07/10 17:41:56 | 4428 | id9369474.1a80abprt 9s248569eb9aa09g c | UPDATE PPP set Low1 = XXX | 2013/07/10 17:40:50 | 2013/07/10 17:41:56 |
| 2013/07/10 17:41:56 | 2483 | id9369474ytu783bpr t9s9nghdieb99tjw4e f | SELECT CCC from DDD | 2013/07/10 17:40:51 | 2013/07/10 17:40:59 |
| 2013/07/10 17:41:56 | 2483 | id9369474ytu783bpr t9s9nghdieb99tjw4e f | SELECT FFF from GGG | 2013/07/10 17:41:56 | |

PROCESS INFORMATION

| INFORMATION ACQUISITION TIME | USED PROCESS NAME | PROCESS ID | SESSION ID | CPU USAGE RATE (%) | MEMORY USAGE RATE | NUMBER OF THREADS |
|---|---|---|---|---|---|---|
| 2013/07/10 17:41:56 | RDBMS | 4524 | id6793474 1a80ab0ab924856 9eb9492acc | 07 | 1,512K | 14 |
| 2013/07/10 17:41:56 | Explorer | 4428 | id9369474 1a80abprt9s24856 9eb3aa03gc | 05 | 1,056K | 6 |
| 2013/07/10 17:41:56 | Batch A | 2483 | id9369474ytuT83bprt9s9nghd ieb39tgw4ief | 12 | 45,284K | 32 |

NETWORK INFORMATION

| INFORMATION ACQUISITION TIME | EXECUTED PROCESS NAME | PROCESS ID | LOCAL ADDRESS | EXTERNAL ADDRESS |
|---|---|---|---|---|
| 2013/07/10 17:41:56 | RDBMS | 2440 | 192.168.1.151:64889 | 192.168.1.124:445 |
| 2013/07/10 17:41:56 | Explorer | 4428 | 192.168.1.151:65129 | 192.168.1.197:6667 |
| 2013/07/10 17:41:56 | Batch A | 2483 | 192.168.1.151:65318 | 192.168.1.128:6442 |

SQL INFORMATION

| INFORMATION ACQUISITION TIME | PROCESS ID | SESSION ID | SQL STATEMENT | PROCESSING START TIME OF SQL | PROCESSING END TIME OF SQL |
|---|---|---|---|---|---|
| 2013/07/10 17:41:56 | 4524 | td6793474ta80ab0a b92485639eb8492ac c | SELECT AAA from BBB | 2013/07/10 17:40:23 | 2013/07/10 17:40:50 |
| 2013/07/10 17:41:56 | 4428 | td9369474ta80abprt 9s248563eb8aa09g c | UPDATE PPP set Low1 = XXX | 2013/07/10 17:40:50 | 2013/07/10 17:41:56 |
| 2013/07/10 17:41:56 | 2483 | td9369474ytu783tpr t9s9nghdieb99tjw4e f | SELECT CCC from DDD | 2013/07/10 17:40:51 | 2013/07/10 17:40:59 |
| 2013/07/10 17:41:56 | 2483 | td9369474ytu783tpr t9s9nghdieb99tjw4e f | SELECT FFF from GGG | 2013/07/10 17:41:56 | |

NETWORK INFORMATION

| INFORMATION ACQUISITION TIME | EXECUTED PROCESS NAME | PROCESS ID | LOCAL ADDRESS | EXTERNAL ADDRESS |
|---|---|---|---|---|
| 2013/07/10 17:41:56 | RDBMS | 2440 | 192.168.1.151:64089 | 192.168.1.124:445 |
| 2013/07/10 17:41:56 | Explorer | 4420 | 192.168.1.151:65129 | 192.168.1.137:6667 |
| 2013/07/10 17:41:56 | Batch A | 2483 | 192.168.1.151:65318 | 192.168.1.129:6442 |

RESOURCE USE STATUS

| INFORMATION ACQUISITION TIME | PROCESS ID | CPU USAGE RATE | MEMORY USAGE RATE |
|---|---|---|---|
| 2013/07/10 17:40:40 | 2483 | 35.0% | 300MB |
| 2013/07/10 17:40:50 | 2483 | 35.2% | 320MB |
| 2013/07/10 17:41:00 | 2483 | 35.0% | 315MB |
| 2013/07/10 17:41:10 | 2483 | 35.1% | 307MB |
| 2013/07/10 17:41:20 | 2483 | 34.8% | 310MB |
| 2013/07/10 17:41:30 | 2483 | 35.1% | 301MB |
| 2013/07/10 17:41:40 | 2483 | 35.5% | 300MB |
| 2013/07/10 17:41:50 | 2483 | 35.0% | 299MB |
| 2013/07/10 17:42:00 | 2483 | 35.2% | 305MB |

FIG. 32

SQL INFORMATION

| INFORMATION ACQUISITION TIME | PROCESS ID | SESSION ID | SQL STATEMENT | PROCESSING START TIME OF SQL | PROCESSING END TIME OF SQL |
|---|---|---|---|---|---|
| 2013/07/10 17:41:56 | 4524 | id6793d741a80ab0a b9248569eb9492ac c | SELECT AAA from BBB | 2013/07/10 17:40:23 | 2013/07/10 17:40:50 |
| 2013/07/10 17:41:56 | 4428 | id9363d741a80abprt 9s248569eb9aa09g c | UPDATE PPP set Low1 = XXX | 2013/07/10 17:40:50 | 2013/07/10 17:41:55 |
| 2013/07/10 17:41:56 | 2483 | id9363d474ytu783bpr t9s9nghdieb99jwf4e f | SELECT CCC from DDD | 2013/07/10 17:40:51 | 2013/07/10 17:40:59 |
| 2013/07/10 17:41:56 | 2483 | id9363d474ytu783bpr t9s9nghdieb99jwf4e f | SELECT FFF from GGG | 2013/07/10 17:41:56 | |

NETWORK INFORMATION OF WEB SERVER

| INFORMATION ACQUISITION TIME | EXECUTED PROCESS NAME | PROCESS ID | LOCAL ADDRESS | EXTERNAL ADDRESS |
|---|---|---|---|---|
| 2013/07/10 17:41:56 | Internet Explorer | 2440 | 192.168.1.197:64899 | 192.168.1.20:445 |
| 2013/07/10 17:41:56 | Explorer | 4426 | 192.168.1.197:65129 | 192.168.1.128:5557 |
| 2013/07/10 17:41:56 | Batch A | 2483 | 192.168.1.197:65318 | 192.168.1.90:5442 |

BATCH SERVER LIST INFORMATION

| REGISTRATION DATE AND TIME | BATCH SERVER IP ADDRESS | LATEST UPDATE DATE AND TIME |
|---|---|---|
| 2013/05/12 01:46:30 | 192.168.1.151 | 2013/06/21 01:30:53 |
| 2013/06/02 03:50:12 | 192.168.1.68 | 2013/07/02 03:50:12 |
| 2013/06/21 04:40:21 | 192.168.1.21 | 2013/07/10 04:40:21 |
| 2013/07/09 04:42:10 | 192.168.1.90 | 2013/07/10 04:42:10 |

121: SQL/TASK TYPE HISTORY DB

| INFORMATION ACQUISITION TIME | PROCESS ID | SESSION ID | SQL STATEMENT | PROCESSING START TIME OF SQL | PROCESSING END TIME OF SQL | TASK TYPE | ISSUANCE SOURCE SERVER IP ADDRESS |
|---|---|---|---|---|---|---|---|
| 2013/07/10 17:41:56 | 2440 | id6793474 1a8 0ab0ab924956 9eb9492acc | SELECT AAA from BBB | 2013/07/10 17:40:50 | 2013/07/10 17:41:56 | BATCH TASK | 192.168.1.128 |
| 2013/07/10 17:40:59 | 4428 | id9369474 1a8 0abpt9s24956 9eb9aa09gc | UPDATE PPP set Low1 = XXX | 2013/07/10 17:40:51 | 2013/07/10 17:40:59 | BATCH TASK | 192.168.1.151 |
| 2013/07/10 17:41:56 | 2483 | id9363474yt u7 83bpt9s9nghd le99bjwf4e | SELECT FFF from GGG | 2013/07/10 17:41:56 | | ONLINE TASK | 192.168.1.141 |

SQL INFORMATION

NON-TRANSITORY COMPUTER-READABLE RECORDING MEDIUM HAVING STORED THEREIN CONTROL PROGRAM, CONTROL APPARATUS AND CONTROL METHOD

CROSS-REFERENCE TO RELATED APPLICATION

This application is based upon and claims the benefit of priority of the prior Japanese Application No. 2014-14203 filed on Jan. 29, 2014 in Japan, the entire contents of which are hereby incorporated by reference.

FIELD

The present invention relates to a non-transitory computer-readable recording medium having stored therein a control program, a control apparatus, and a control method.

BACKGROUND

As methods for improving the processing capacity of a task system, scale-out for increasing the number of servers and distributing the load to the servers and scale-up for adding resources (a central processing unit (CPU), a memory, and the like) to a server are known. In addition, recently, cloud computing technologies have been developed, and, under the cloud environment, auto-scaling for performing the scale-out or scale-up according to the processing request amount can be performed.

On the other hand, in the task system, an online task and a batch task are executed. As illustrated in FIG. 36, in an online task, an access to a database (DB) is made from a final user through a network, a web server, and an application (AP) server. On the other hand, in a batch task, an access to the DB server is made by a batch server. FIG. 36 is a diagram that illustrates a configuration example of the task system.

Desired capacity indices and techniques for using resources are different between the online task and the batch task as below.

In the online task, it is desired to maintain the capacity for which a response time does not exceed a set value of the service level agreement (SLA). Thus, in the online task, it is desired to allocate servers and server specifications so as to have a room such that the response time is not delayed even when the processing request amount increases (see FIG. 37). FIG. 37 is a diagram that illustrates an example of the resource use status of a DB server.

In the batch task, it is desired to complete the batch process within a determined time. For example, it is desired to execute the batch process at night and complete the batch process until an online task is started. Thus, in the batch task, if the batch process can be completed within the time, the number of servers and the server specifications can be used to a maximal degree (see FIG. 37).

In a task system executing the online task and the batch task as described above, in order to acquire both the maintenance of the capacity and the effective use of resources, a task operating on the task system is classified into an online task or a batch task. In other words, in order to realize scaling (auto-scaling) according to the task characteristics, it is of importance to appropriately determine whether a task executed by the task system is an online task or a batch task.

As a technique for determining a task to be either an online task or a batch task, a technique for making a determination based on whether or not a message to be determined has a parent-son relation with a message of an upper-layer protocol has been known. Here, the upper-layer protocol, for example, is an Internet inter-object request broker (ORB) protocol (IIOP). More specifically, the determination technique is targeted for messages that are exchanged within a system that is configured by a web server, an AP server, and a DB server. Then, based on the relation between a message delivered from the web server to the AP server and a message delivered from the AP server to the DB server, either an online task or a batch task is determined.

However, according to the determination technique described above, in the case of batch tasks (a1) to (a3) as below, it is not able to be determined whether a structured query language (SQL) processed on the task system is issued in an online task or a batch task.

(a1) Case where Local Batch Task is Executed by DB Server

According to the above-described determination technique, a batch process or an online process is determined for an object of a message of a protocol used in the communication. Accordingly, in a case where a local batch task not using any communication is executed within the DB server, such a determination is not able to be made.

(a2) Case where Remote Batch Task is Executed from Batch Server for DB Server

The determination technique described above is targeted, as described above, for messages exchanged within the system that is configured by the web server, the AP server, and the DB server. Thus, as illustrated in FIG. 38, a message transferred between the batch server, which is excluded from the target system configuration, and the DB server is not considered, and the process of detecting such a message is not present. Accordingly, the determination of an online task or a batch task is not able to be made. FIG. 38 is a diagram that illustrates a problem in the above-described determination technique (known technique). In FIG. 38, "RDBMS" is an abbreviation for a relational database management system.

(a3) Case where Web Service Batch Task is Executed Through Web Server and AP Server In the above-described determination technique, as described above, the relation between a message issued from the AP server to the DB server and a message of the IIOP issued from the web server is used as a determination criterion. In addition, between the web service batch task and the online task, as illustrated in FIG. 39, there is only a difference in that the issuance source of the SQL is a final user or the batch server, and the path after the web server is the same. Accordingly, for a message issued from the AP server, the relation with the IIOP occurs in both the online task and the batch task, and the determination of an online task or a batch task is not able to be made. FIG. 39 is a diagram that illustrates a problem in the above-described determination technique (known technique).

SUMMARY

A control program recorded on a non-transitory computer-readable recording medium causes a computer to execute a process including: acquiring processing request information of a processing request for a first computer by a second computer; acquiring first operation information and second operation information that relate to operations of the first computer and the second computer, respectively; and determining a type of the processing request based on processing result information, the processing request information, the first operation information, and the second operation information. The processing result information associates a processing history of the first computer according to the processing request included in the processing request information for the first computer with the second operation information that relates to the processing request by the second computer making the processing request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 1 and 2 are diagrams that illustrate an overview of a task type determining technique according to the present embodiment;

FIG. 3 is a diagram that illustrates the determinability according to the determination technique according to the present embodiment and the determinability according to a known technique in a comparative manner;

FIGS. 4 and 5 are diagrams that illustrate examples of a resource use status according to a known technique;

FIG. 9 is a diagram that illustrates an example of SQL information acquired by the DB information collecting unit illustrated in FIG. 6;

FIG. 10 is a diagram that illustrates an example of process information acquired by the DB information collecting unit illustrated in FIG. 6;

FIG. 11 is a diagram that illustrates an example of network information acquired by the DB information collecting unit illustrated in FIG. 6;

FIG. 13 is a diagram that illustrates a storage process for an SQL/task type history DB illustrated in FIG. 6;

FIG. 14 is a diagram that illustrates an example of information stored in the SQL/task type history DB illustrated in FIG. 6;

FIG. 26 is a diagram that illustrates an example of SQL information for describing the local batch task determining process according to the present embodiment;

FIG. 27 is a diagram that illustrates an example of process information for describing the local batch task determining process according to the present embodiment;

FIG. 28 is a diagram that illustrates an example of network information for describing the local batch task determining process according to the present embodiment;

FIG. 29 is a diagram that illustrates an example of the SQL information for describing a remote batch task determining process according to the present embodiment;

FIG. 30 is a diagram that illustrates an example of network information for describing the remote batch task determining process according to the present embodiment;

FIG. 31 is a diagram that illustrates an example of a resource use status (processing result information) for describing the remote batch task determining process according to the present embodiment;

FIG. 32 is a diagram that illustrates an example of SQL information for describing a web service batch task/online task determining process according to the present embodiment;

FIG. 33 is a diagram that illustrates an example of network information for describing the web service batch task/online task determining process according to the present embodiment;

FIG. 34 is a diagram that illustrates an example of information stored in the batch server list information DB for describing the web service batch task/online task determining process according to the present embodiment;

FIG. 35 is a diagram that illustrates an example of the SQL/task type history DB that is output as a result of a determination according to the present embodiment;

DESCRIPTION OF EMBODIMENTS

Figure 1:
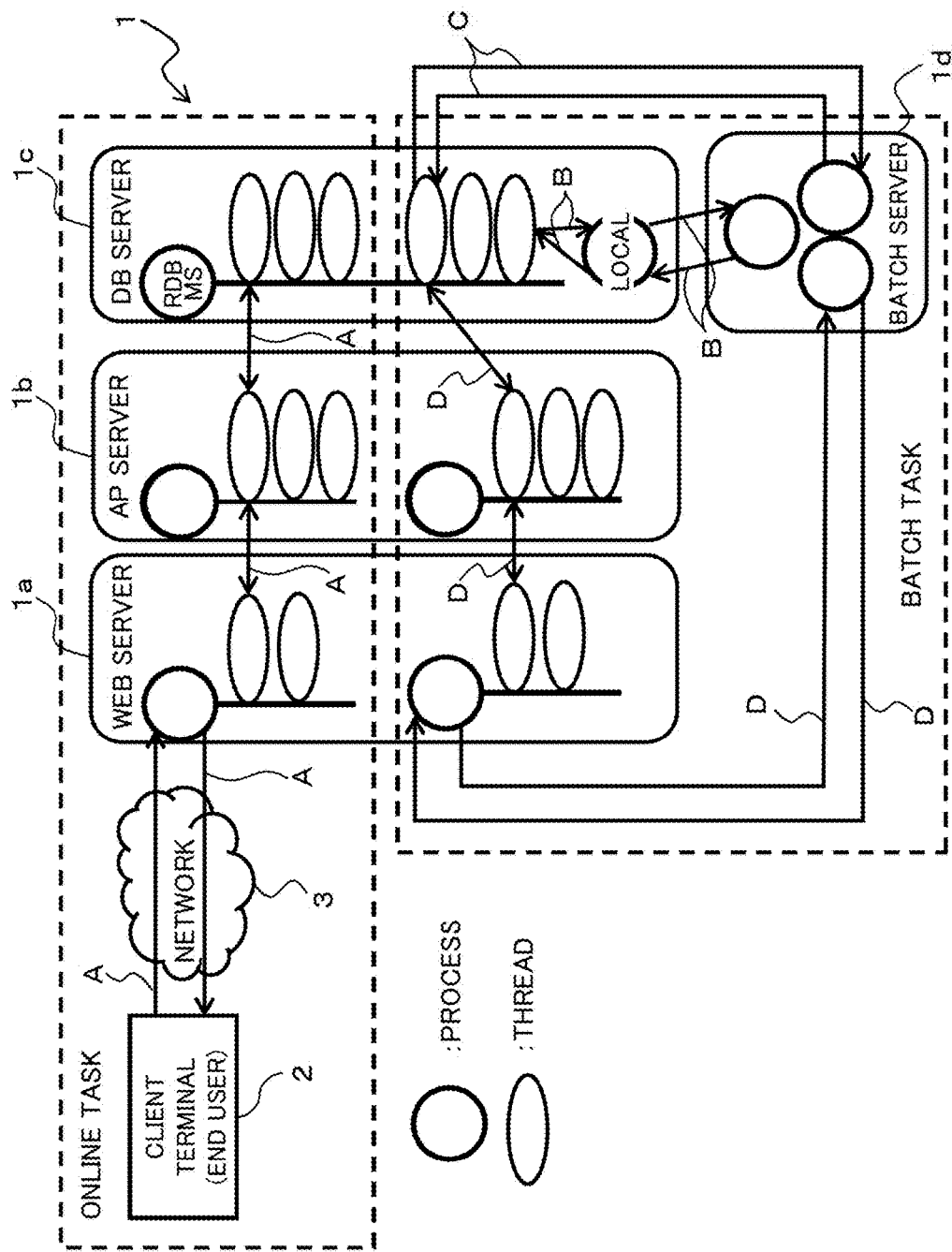

Hereinafter, a non-transitory computer-readable recording medium having stored therein a control program, a control apparatus, a control method according to embodiments to be disclosed here will be described in detail with reference to the drawings. However, the embodiments represented hereinafter are merely examples but are not intended for excluding various modifications and the application of technologies not explicitly described in the embodiments. In other words, the embodiments may be variously modified in a range not departing from the concept thereof. In addition, each diagram is not intended for representing that only constituent elements illustrated in the diagram are included, but any other function may be included. In addition, the embodiments can be appropriately combined in a range in which the processing contents are not contradictory to each other.

[1] Overview of Technique for Determining Task Type According to Embodiment

As techniques for auto-scaling a task system, the following techniques (b1) and (b2) are known.

(b1) Technique for Auto-Scaling Based on Resource Usage Rate or Threshold of Response Time Set in Advance (Function Provided in General Cloud Service)

According to the technique (b1), a threshold (for example, 70%) of the usage rate of a resource such as a CPU or a memory and a threshold (for example, one second) of a response time are set in advance. Then, in a case where the usage rate of the resource and the response time exceed the respective thresholds, scale-out or scale-up is performed. On the other hand, in a case where the usage rate of the resource and the response time are the respective thresholds or less, scale-in or scale-down is performed. According to such an auto-scale function, a server/resource is added after the usage rates of the resources and the response time exceed the respective thresholds. Accordingly, it takes time until the server/resource is actually added from a time point when the threshold is exceeded. Thus, the response time of the online task is delayed to violate the SLA, or the batch task is influenced not to be completed until predetermined time. Generally, it takes about five minutes until the added server/resource becomes usable after the detection of an alarm representing that the threshold is exceeded. The time depends on the congestion status of the cloud side or the server type to be generated, and accordingly, it may take five or minutes depending on the situations.

(b2) Technique for Auto-Scaling Based on Threshold of Resource Usage Rate and Response Time Set in Advance and Future Prediction Result According to this technique (b2), the threshold (for example, 70%) of the usage rate of a resource such as a CPU or a memory and the threshold (for example, one second) of the response time are set in advance. Then, the demand (the resource usage rate or the response time) for the resource is predicted through a further prediction (a regression line or the like) based on a past result or the like, and, in a case where the predicted value exceeds the threshold, scale-out or scale-down is performed. On the other hand, in a case where the predicted value is the threshold or less, scale-in or scale-down is performed. According to this technique (b2), the problem of the technique (b1) described above is solved. However, the techniques (b1) and (b2) are mainly targeted for an online task, and the characteristics of a batch task are not considered.

For this reason, according to the techniques (b1) and (b2) described above, since the processing capacity of the server/resource is used to a maximal degree in a batch task, for example, as illustrated in FIG. 4, endless scale-out/scale-in is repeated until the batch task is completed. In the example illustrated in FIG. 4, scale-out is performed four times. As a result, the actual processing time of the batch task is shortened, and the completion time of the batch task is moved forward. However, the batch task time is not able to be used to a maximal degree, and accordingly, there is a waste time. In other words, unnecessary scale-out is performed to incur costs. FIG. 4 is a diagram that illustrates an example of a resource use status according to the techniques (b1) and (b2) described above.

In addition, in order to respond to a plurality of types of tasks, auto-scaling (see the technique (b1) or (b2) described above) can be performed with the period of time being divided for each task type. At this time, in a case where a batch task executed during a batch task period abnormally ends (ABEND) for any reason, the batch task that has abnormally ended (ABEND) necessarily needs to be re-executed and completed after the recovery of the batch task. However, for example, as illustrated in FIG. 5, in a case where a situation occurs in which the batch task is not recovered at night time of the batch task period and is re-executed during day time of the online task period, inappropriate scaling is performed. In other words, during the day time, generally, auto-scaling (see the technique (b1) or (b2) described above) for an online task is applied, and accordingly, in that state, as illustrated in FIG. 5, inappropriate scaling that is not appropriate for the status is performed. FIG. 5 is a diagram that illustrates an example of a resource use status according to a known technique.

In addition, for example, in a case where the number of accesses from overseas such as U.S.A. having a time difference of around 12 hours temporarily increases owing to overseas sales promotions, the business hours at the local place corresponds to night time for the time zone of Japan, and the number of online tasks unexpectedly increases during the batch task period. However, at the night time, auto-scaling is frequently suppressed, scaling corresponding to the online task is not able to be executed, and, as a result, an SLA violation such as a response delay occurs.

As above, depending only on the history of the past, the scheduling of auto-scaling covering a plurality of types of tasks (for example, an online task and a batch task) in which the methods of using resources are different from each other is not able to be realized. In addition, it is difficult to manually respond to all the unexpected increases in the task that is not able to be predicted.

In order to achieve both the maintenance of the processing capacity and the effective use of resources in a task system including a plurality of types of tasks, it is desired to divide tasks operating on the task system into online tasks and batch tasks. However, based on the conventional determination techniques described above, in the case of the batch tasks (a1) to (a3) described above, whether an SQL processed on the task system is issued in an online task or a batch task is not able to be determined.

Figure 39:
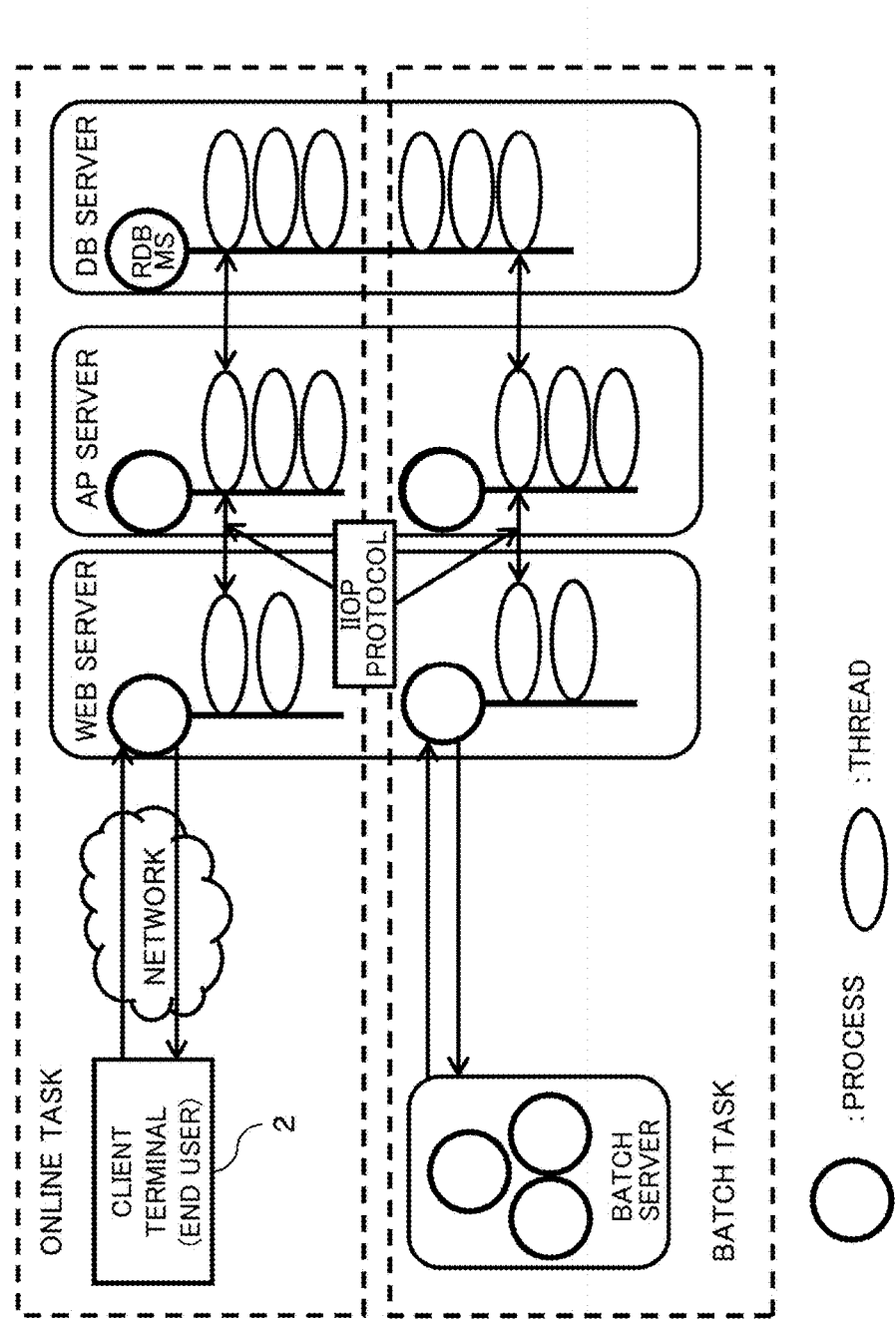

Furthermore, recently, a batch process (see the batch task (a3) described above) is configured to be provided by an online service (web service). The batch process provided by the online service, as illustrated in FIG. 39, similar to the online task, a web server and an AP server are used. For this reason, it is difficult to determine whether a task executed on a DB server is an online task or a batch task, and it is desired to check whether the issuance source of the processing request (SQL) is a final user or a batch server. In the current state, a technique for determining whether a task is an online task or a batch task in a batch task using a web service has not been established.

According to the present embodiment, as described below, it can be appropriately determined in an automatic manner whether a task is an online task or a batch task based on ostensible information such as capacity information and connection information, in other words, general information acquired from an operating system (OS) or the like. In this way, auto-scaling according to the characteristics of a task is realized.

Here, an overview of a task type (processing request type) determining technique according to the present embodiment will be described with reference to FIGS. 1 to 2. FIGS. 1 and 2 are diagrams that illustrate the overview of the task type determining technique according to the present embodiment. The task system 1 illustrated in FIG. 1 includes: a web server 1a; an AP server 1b; a DB server 1c; and a batch server 1d. The function and the like of each of the servers 1a to 1d will be described later with reference to FIG. 6. A final user (client terminal) 2 is connected to the task system 1 (web server 1a) through a network 3, and the task system 1 is configured to execute an online task according to a processing request from the final user 2 or the like.

As patterns of an online task and a batch task, as illustrated in FIG. 1, there are four patterns A to D. The task type and the characteristics of each of the patterns A to D are as follows. In description presented below, a "task" may be referred to as a "process".

Pattern A: Online Task (See Arrow a Illustrated in FIG. 1 for the Flow of the Process of the Task)

The characteristics of the online task are as represented in the following sections (A1) to (A3).

(A1) An access from the final user 2 passes through the web server 1a and the AP server 1b.

(A2) The AP server 1b remotely issues an SQL to the DB server 1c.

(A3) A thread of an RDBMS arranged inside the DB server 1c is started, and an online process is executed.

Pattern B: Local Batch Task (See Arrow B Illustrated in FIG. 1 for the Flow of the Process of the Task)

The characteristics of the local batch task are as represented in the following sections (B1) to (B3).

(B1) The batch server 1d starts a local batch process arranged inside the DB server 1c.

(B2) A local batch process arranged inside the DB server 1c is started.

(B3) A thread of the RDBMS arranged inside the DB server 1c is started, and the batch process is executed.

Pattern C: Remote Batch Task (See Arrow C Illustrated in FIG. 1 for the Flow of the Process of the Task)

The characteristics of the remote batch task are as represented in the following sections (C1) and (C2).

(C1) The batch server 1d remotely issues an SQL to the DB server 1c.

(C2) A thread of the RDBMS arranged inside the DB server 1c is started, and a batch process is executed.

Pattern D: Web Service Batch Task (See Arrow D Illustrated in FIG. 1 for the Flow of the Process of the Task)

The characteristics of the web service batch task are as represented in the following sections (D1) to (D3).

(D1) An access from the batch server 1d passes through the web server 1a and the AP server 1b through a web service.

(D2) The AP server 1b remotely issues an SQL to the DB server 1c.

(D3) A thread of the RDBMS arranged inside the DB server 1c is started, and a batch process is executed.

The characteristics described above can be summarized as illustrated in FIG. 2. Criteria I to III for determining the patterns A to D will be described with reference to FIG. 2.

First, it is determined whether a task that is a determination target is a local batch task or one of the other tasks based on the criterion I illustrated in FIG. 2. In other words, when a task that is a determination target is executed, in a case where a local batch process is started by the DB server 1c, the task that is the determination target is determined as a local batch task.

On the other hand, in a case where the local batch process has not been not started by the DB server 1c, the task that is the determination target is determined as a task other than a local batch task, and, based on the criterion II illustrated in FIG. 2, it is determined whether the task that is the determination target is a remote batch task or one of the other tasks. In other words, in a case where the issuance source of a remote SQL for the task that is the determination target is the batch server 1d, the task that is the determination target is determined as a remote batch task.

In a case where the issuance source of the remote SQL for the task that is the determination target is not the batch server 1d, the task that is the determination target is determined as a task other than the remote batch task, and, based on the criterion III illustrated in FIG. 2, it is determined whether the task that is the determination target is a web service batch task or an online task. In other words, as will be described later, in a case where the address of an SQL issuance source server is registered in a storage unit (memory unit) 120 (batch server list information DB 122; see FIG. 6), the task that is the determination target is determined as a web service batch task. On the other hand, in a case where the address of the SQL issuance source server is not registered in the storage unit 120 (batch server list information DB 122), the task that is the determination target is determined as an online task.

An overview of a technique for automatically determining the patterns A to D based on the criteria I to III as above will be described below. According to the technique of the present embodiment, a processing unit (processor) 110 (see FIG. 6) to be described later executes a determination process/control process in the following sequences 1 to 4.

Sequence 1: Processing request information (SQL information) of a processing request for a first computer (the DB server 1c) by a second computer (each of the web server 1a, the AP server 1b, and the batch server 1d) is acquired.

Sequence 2: First operation information and second operation information (process information and network information), which relate to the operations of the first computer (DB server 1c) and the second computer (each of the web server 1a, the AP server 1b, and the batch server 1d), respectively, are acquired.

Sequence 3: The type (batch task/online task) of the processing request is determined based on processing result information, the processing request information (SQL information), and the first operation information and the second operation information (the process information and the network information). The processing result information described above is information associating a processing history of the DB server 1c corresponding to the processing request included in the processing request information for the DB server 1c, with the second operation information (process information) relating to the processing request by the AP server 1b or the batch server 1d which has made the processing request. A specific example of the processing result information will be described later with reference to FIGS. 19 and 31.

Sequence 4: Resources allocated to the task system 1 (servers 1a to 1d) are controlled based on a result of the determination of the type of the processing request.

At this time, according to the technique of the present embodiment, a processing unit 110 executes the process of determining a local batch process in the following sequences 11 to 14.

Sequence 11: It is determined whether or not issuance source process identification information of the processing request that is included in the processing request information is present in the process information included in the first operation information that is acquired from the DB server $1c$.

Sequence 12: In a case where the issuance source process identification information of the processing request is present in the process information, the type of the processing request is determined as a local batch process according to the batch server $1d$.

Sequence 13: First address information of the batch server $1d$ that has issued the processing request for the local batch process is acquired based on the processing request information and the first operation information (network information).

Sequence 14: The first address information is stored in the storage unit 120 (batch server list information DB 122).

Next, according to the technique of the present embodiment, the processing unit 110 executes the process of determining a remote batch process in the following sequences 21 to 25.

Sequence 21: In a case where the issuance source process identification information of the processing request is not present in the process information, second address information of the AP server $1b$ or the batch server $1d$ that has issued the processing request is acquired based on the processing request information and the first operation information (network information).

Sequence 22: A first resource usage amount from a start of previous processing according to a previous processing request to an end of the previous processing and a second resource usage amount from an end of the previous processing to a start of the processing according to the processing request are acquired as the processing result information from the AP server $1b$ or the batch server $1d$ that is designated by the second address information.

Sequence 23: It is determined whether or not the second resource usage amount has increased with respect to the first resource usage amount.

Sequence 24: In a case where the second resource usage amount has increased with respect to the first resource usage amount, the type of the processing request is determined as a remote batch process according to the batch server $1d$.

Sequence 25: The second address information is stored in the storage unit 120 (batch server list information DB 122) as the address information of the batch server $1d$.

Next, according to the technique of the present embodiment, the processing unit 110 executes the process of determining a web service batch process or an online process in the following sequences 31 to 35.

Sequence 31: In a case where the second resource usage amount has not increased with respect to the first resource usage amount, the second address information is acquired as the address information of the AP server $1b$.

Sequence 32: Third address information of the issuance server of the processing request is detected based on the processing request information, the address information of the AP server $1b$, and the first operation information (network information) acquired from the web server $1a$.

Sequence 33: It is determined whether or not the third address information is stored in the batch server list information DB 122.

Sequence 34: In a case where the third address information is stored in the batch server list information DB 122, the type of the processing request is determined as a web service batch process that is executed by the batch server $1d$ through the web server $1a$.

Sequence 35: In a case where the third address information is not stored in the storage unit 120 (batch server list information DB 122), the type of the processing request is determined as an online process.

The determinability according to the determination technique of the present embodiment as described above and the determinability according to the above-described known technique are compared with each other to be illustrated in FIG. 3. In FIG. 3, the task type, the system configuration and the flow of the process for each task type, and the determinability according to the known technique, and the determinability according to the determination technique of the present embodiment are associated with one another.

As illustrated in FIG. 3, according to the above-described known technique, a local batch task and a web service batch task is not able to be determined (NG). On the other hand, a remote batch task and an online task can be partly determined (partly OK). In addition, according to the above-described known technique, while a batch task issued from the AP server $1b$ can be determined, a batch task issued from the batch server $1d$ is not able to be determined. Furthermore, regarding an online task, a web service batch task is determined also as an online task.

In contrast to this, according to the determination technique of the present embodiment, as illustrated in FIG. 3, any one of a local batch task, a remote batch task, a web service batch task, and an online task that correspond to four patterns A to D can be determined.

[2] Configuration of the Present Embodiment

Figure 6:
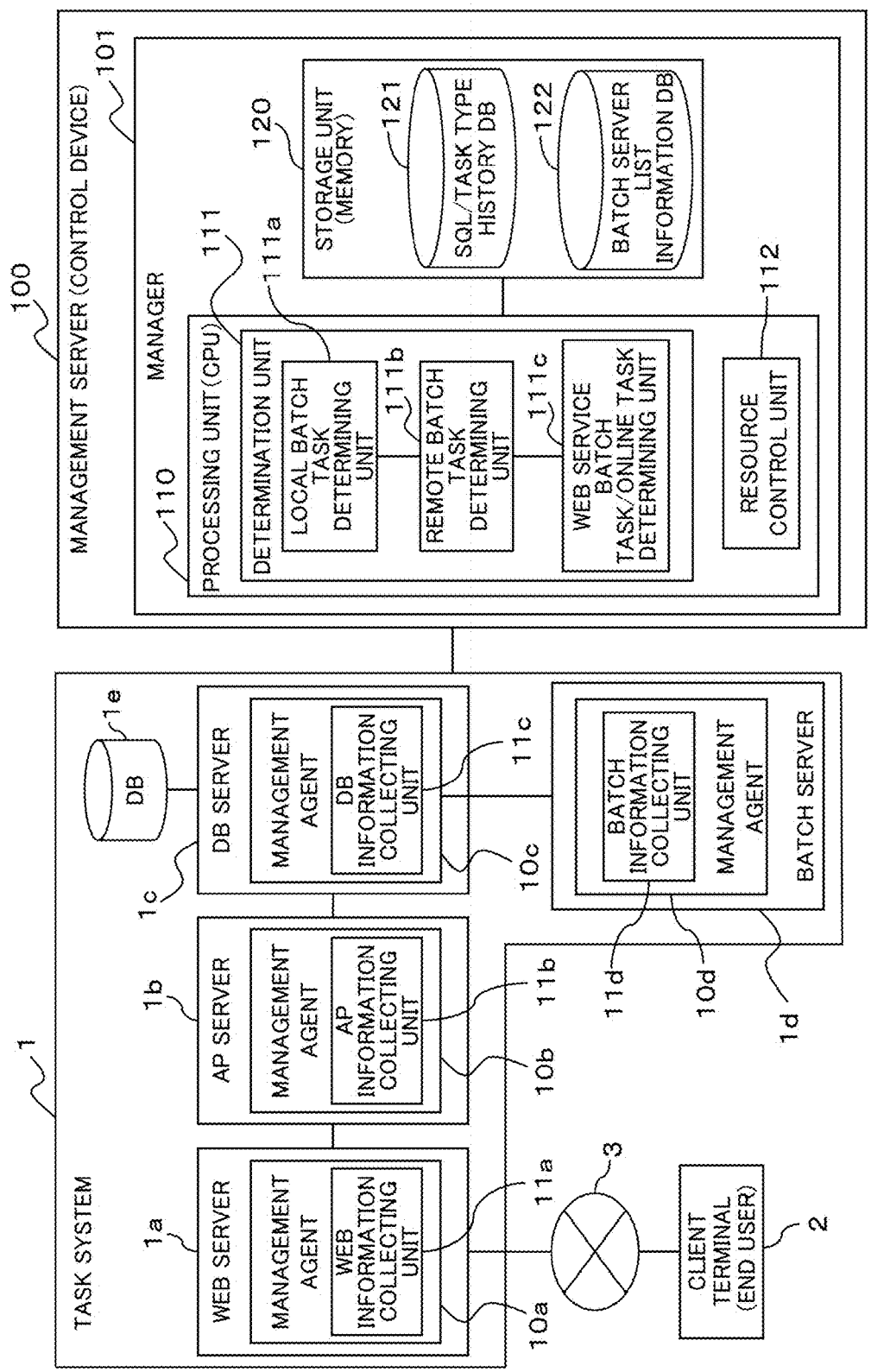
FIG. 6 is a block diagram that illustrates a hardware configuration example and a functional configuration example of a task system and a management server (control device) according to the present embodiment.

First, the configurations of the task system 1 and the management server (control device) 100 according to the present embodiment will be described with reference to FIG. 6. FIG. 6 is a block diagram that illustrates a hardware configuration example and a functional configuration example of the task system 1 and the management server (control device) 100 according to the present embodiment.

The task system 1 according to the present embodiment illustrated in FIG. 6 is configured to be similar to the task system 1 described above with reference to FIG. 1. In other words, the task system 1 includes: a web server $1a$; an AP server $1b$; a DB server $1c$; a batch server $1d$; and a database (DB) $1e$. In addition, a final user (client terminal) 2 is connected to the task system 1 (web server $1a$) through a network 3, and the task system 1 is configured to execute an online task according to a processing request from the final user 2 or the like. As the network 3, the Internet, a local area network (LAN), a wide area network (WAN), or the like is used.

Here, the task system 1 is a system in which an online task (pattern A) and batch tasks (patterns B to D) are mixed. The online task is a task that executes processing according to a processing request from the client terminal 2. On the other hand, the batch task is a task that executes a batch process of data, for example, collected for a predetermined period or executes continuous processing of a process configured by a plurality of sequences in a predetermined sequence and has three patterns B, C, and D described above.

In addition, the management server (control device) 100 is connected to the task system 1. The management server 100 determines the type of the processing request (task) for the DB server $1c$ and adds/reduces resources (a server, a CPU, a memory, and the like) of the task system 1 based on a result of the determination, in other words, auto-scaling. In addition, the web server 1a, the AP server 1b, the DB server 1c, the batch server 1d, and the management server 100 are communicably interconnected through a network such as the Internet, a LAN, or a WAN.

Here, the web server 1a is a computer that transmits a hypertext markup language (HTML) document according to a processing request from a browser installed to the client terminal 2. The AP server 1b is a computer that relays between the web server 1a and the DB server 1c and controls processes (a search process, an update process, a deletion process, and the like) for a DB 1e. The DB server 1c is a computer that includes the DB 1e storing a data group and executes the process for the DB 1e. The batch server 1d is a computer that accesses the data group stored in the DB 1e through the DB server 1c and executes a batch task based on the data group. The client terminal 2 is a computer that is equipped with a browser and communicates with the web server 1a. The client terminal 2, for example, is a personal computer, a smartphone, or a portable telephone terminal.

In the management server 100 according to the present embodiment, a manager 101 is arranged. The manager 101 at least includes: a processing unit (processor) 110 such as a CPU, a micro-processing unit (MPU), or a computer; and a memory unit (a memory or a storage unit) 120 such as a random access memory (RAM), a hard disk drive (HDD), or a solid state device (SSD).

The processing unit 110 reads a predetermined application program (control program) from the memory unit 120 and executes the read program, thereby achieving not only the functions of a first acquisition unit and a second acquisition unit to be described later but also the functions of a determination unit 111 and a resource control unit 112. The predetermined application program is provided in a form being recorded on a computer-readable recording medium such as a flexible disk, a CD (a CD-ROM, a CD-R, a CD-RW, or the like), a DVD (a DVD-ROM, a DVD-RAM, a DVD-R, a DVD-RW, a DVD+R, or a DVD+RW), or a Blu-ray disk. In such a case, the processing unit 110 reads the program from the recording medium and transmits the read program to the memory unit 120 as an internal memory device or an external memory device so as to be stored therein and used.

The memory unit 120 not only stores the predetermined application program but also stores various kinds of information and the like for the process executed by the processing unit 110. For example, the memory unit 120 stores an SQL/task type history DB 121 and the batch server list information DB 122 as the various kinds of information and the like. The SQL/task type history DB 121 will be described later with reference to FIGS. 13 and 14. In addition, the batch server list information DB 122 will be described later with reference to FIGS. 15 and 16.

The manager 101 (processing unit 110) arranged in the management server 100 achieves the functions of the first acquisition unit and the second acquisition unit that collect and acquire various kinds of information to be described later from management agents 10a to 10d respectively arranged in a server group (servers 1a to 1d) that is arranged inside the task system 1. The management agents 10a to 10d respectively have functions of a web information collecting unit 11a, an AP information collecting unit 11b, a DB information collecting unit 11c, and a batch information collecting unit 11d.

Figure 7:
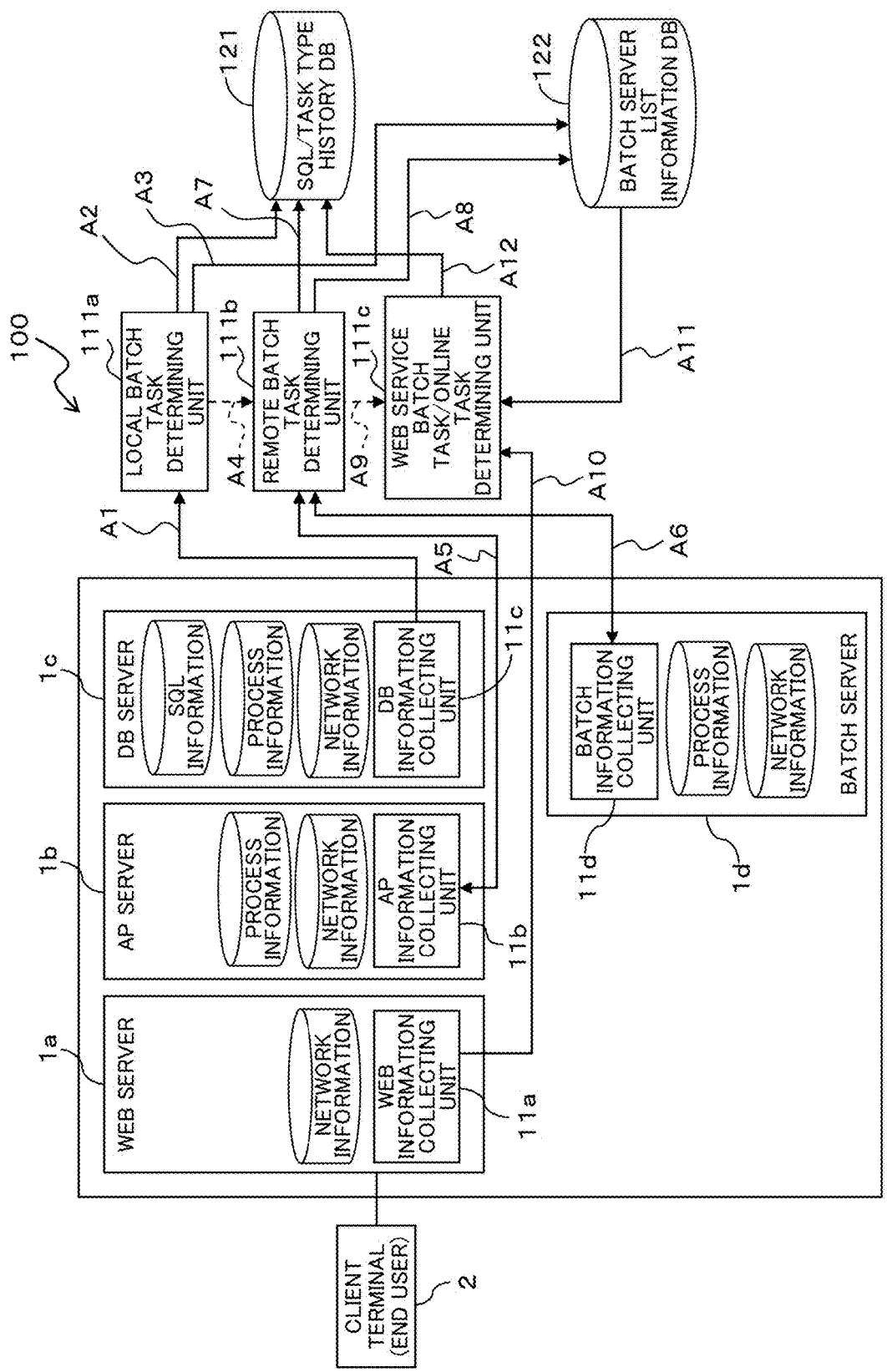
FIG. 7 is a diagram that illustrates the flow of the process according to a task type determination technique according to the present embodiment.
Figure 21:
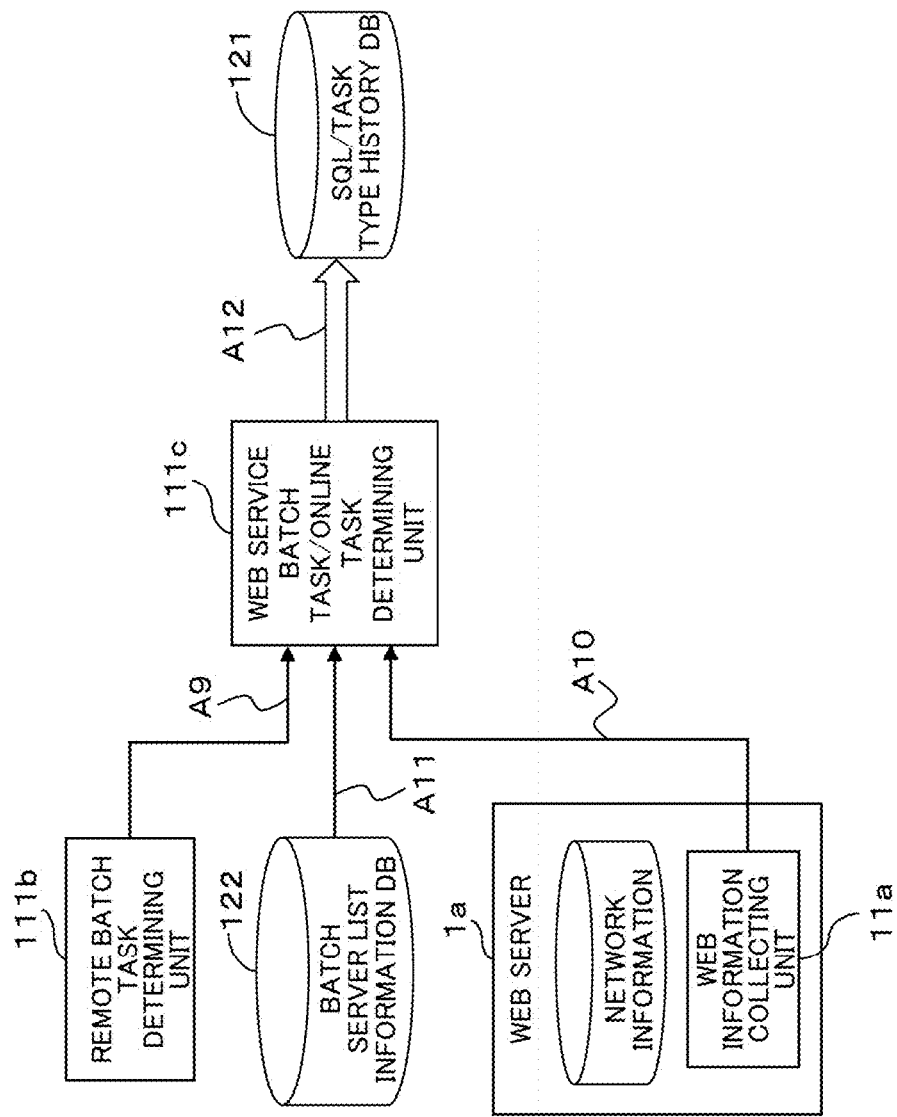
FIG. 21 is a diagram that illustrates the function and the operation of a web service batch task/online task determining unit illustrated in FIG. 6.

The web information collecting unit 11a collects network information of the web server 1a and notifies the processing unit 110 (web service batch task/online task determining unit 111c) of the collected network information (see FIGS. 7 and 21). The processing unit 110 receives the network information of the web server 1a from the web information collecting unit 11a, thereby achieving the function of the second acquisition unit that receives the second operation information relating to the operation of the web server 1a together with the web information collecting unit 11a.

Figure 18:
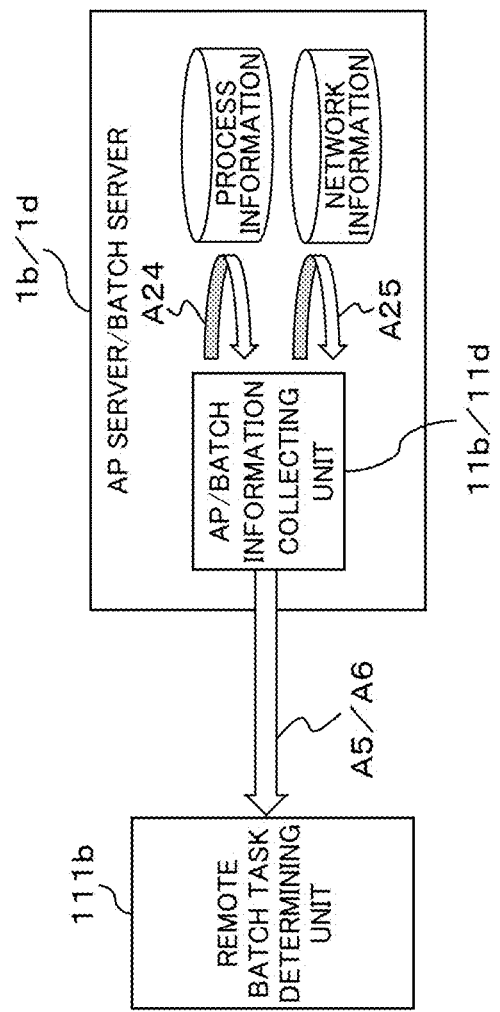
FIG. 18 is a diagram that illustrates the function and the operation of an AP information collecting unit or a batch information collecting unit illustrated in FIG. 6.
Figure 20:
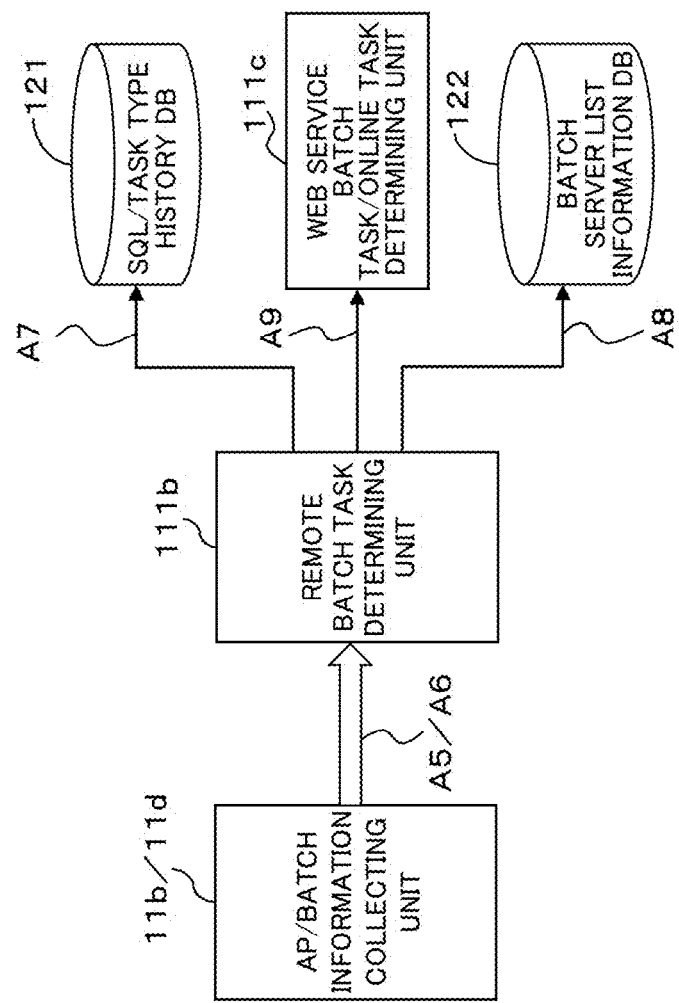
FIG. 20 is a diagram that illustrates the function and the operation of the remote batch task determining unit illustrated in FIG. 6.

The AP information collecting unit 11b collects the process information and the network information of the AP server 1b and notifies the processing unit 110 (remote batch task determining unit 111b) of the collected information (FIGS. 7, 18, and 20). The processing unit 110 receives the process information and the network information of the AP server 1b from the AP information collecting unit 11b, thereby achieving the function of the second acquisition unit that acquires the second operation information relating to the operation of the AP server 1b together with the AP information collecting unit 11b.

The DB information collecting unit 11c collects the SQL information (processing request information from the servers 1a to 1c) for the DB server 1c and the process information and the network information of the DB server 1c and notifies the processing unit 110 (local batch task determining unit 111a) of the collected information (see FIGS. 7 to 12). The processing unit 110 receives the SQL information from the DB information collecting unit 11c, thereby achieving the function of the first acquisition unit that acquires the processing request information from the servers 1a to 1c together with the DB information collecting unit 11c. In addition, the processing unit 110 receives the process information and the network information of the DB server 1c from the DB information collecting unit 11c, thereby achieving the function of the second acquisition unit that acquires the second operation information relating to the operation of the DB server 1c together with the DB information collecting unit 11c.

The batch information collecting unit 11d collects the process information and the network information of the batch server 1d and notifies the processing unit 110 (remote batch task determining unit 111b) of the collected information (see FIGS. 7, 18, and 20). The processing unit 110 receives the process information and the network information of the batch server 1d from the batch information collecting unit 11d, thereby achieving the function of the second acquisition unit that acquires the second operation information relating to the operation of the batch server 1d together with the batch information collecting unit 11d.

Next, the function of the determination unit 111 (the local batch task determining unit 111a, the remote batch task determining unit 111b, and the web service batch task/online task determining unit 111c) and the resource control unit 112 that is realized by the processing unit 110 will be described.

The determination unit 111 determines the type of the processing request, in other words, the task type (a batch task or an online process) executed by the task system 1 based on the processing result information, the SQL information (the processing request information for the DB server 1c) notified from the DB information collecting unit 11c, and the process information and the network information notified from the collecting units 11a to 11d.

Here, the processing result information is notified from the AP information collecting unit 11b or the batch information collecting unit 11d as the process information. The processing result information associates the processing history of the DB server 1c that corresponds to a processing request included in the SQL information of the processing request for the DB server 1c with the process information relating to the processing request of the AP server 1b or the batch server 1d that has made the processing request. A specific example of the processing result information will be described later with reference to FIGS. 19 and 31.

More specifically, the determination unit 111 includes the local batch task determining unit 111a, the remote batch task determining unit 111b, and the web service batch task/online task determining unit 111c and determines the task type using the determining units 111a to 111c.

The local batch task determining unit 111a executes the process of determining a local batch task (pattern B; the batch task (a1) described above) in Sequences 11 to 14 described above. In other words, the local batch task determining unit 111a, first, determines whether or not the issuance source process ID (identification information) of the processing request included in the SQL information is present in the process information acquired from the DB server 1c (Sequence 11). In a case where the issuance source process identification information of the processing request is present in the process information, the local batch task determining unit 111a determines that the task type is a local batch process executed by the batch server 1d (Sequence 12). At this time, the local batch task determining unit 111a acquires the internet protocol (IP) address (first address information) of the batch server 1d that has issued the processing request of the local batch process based on the SQL information and the network information acquired from the batch server 1d (Sequence 13). Then, the local batch task determining unit 111a stores the IP address of the batch server 1d in the batch server list information DB 122 stored in the storage unit 120 (Sequence 14). A specific process of determining a local batch task (pattern B; the batch task (a1) described above) that is executed by the local batch task determining unit 111a will be described later with reference to FIGS. 12 and 23.

The remote batch task determining unit 111b executes the process of determining a remote batch task (pattern C; the batch task (a2) described above) in Sequences 21 to 25 described above. In other words, in a case where the issuance source process ID of the processing request is not present in the process information, the remote batch task determining unit 111b acquires the IP address (second address information) of the AP server 1b or the batch server 1d that has issued the processing request based on the SQL information and the network information (Sequence 21). Next, the remote batch task determining unit 111b acquires the first resource usage amount from a start of previous processing according to a previous processing request to an end of the previous processing and the second resource usage amount from an end of the previous processing to a start of the processing according to the processing request as the processing result information from the AP server 1b or the batch server 1d that is designated by the acquired IP address (Sequence 22). Then, the remote batch task determining unit 111b determines whether or not the second resource usage amount has increased with respect to the first resource usage amount (Sequence 23). In a case where the second resource usage amount has increased with respect to the first resource usage amount, the remote batch task determining unit 111b determines the task type as a remote batch process executed by the batch server 1d (Sequence 24). Then, the remote batch task determining unit 111b stores the IP address acquired as the second address information in the batch server list information DB 122 stored in the storage unit 120 as the address information of the batch server 1d (Sequence 25). A specific process of determining a local batch task (pattern C; the batch task (a2) described above) that is executed by the remote batch task determining unit 111b will be described later with reference to FIGS. 17 to 20 and 24. Here, the first resource usage amount, for example, is a usage amount during a period TA illustrated in FIG. 19, and the second resource usage amount, for example, is a usage amount during a period TB illustrated in FIG. 19.

The web service batch task/online task determining unit 111c executes the process of determining a web service batch task (pattern D; the task (a3) described above) in Sequences 31 to 35—described above. In a case where the second resource usage amount has not increased with respect to the first resource usage amount, the web service batch task/online task determining unit 111c acquires the IP address acquired as the second address information as the address information of the AP server 1b (Sequence 31). The web service batch task/online task determining unit 111c detects the IP address (third address information) of the issuance source server of the processing request based on the SQL information, the IP address of the AP server 1b, and the network information acquired from the web server 1a (Sequence 32). Then, the web service batch task/online task determining unit 111c determines whether or not the IP address (third address information) is stored in the batch server list information DB 122 (Sequence 33). In a case where the IP address (third address information) is stored in the batch server list information DB 122, the web service batch task/online task determining unit 111c determines that the task type is a web service batch task that is executed by the batch server 1d through the web server 1a (Sequence 34). On the other hand, in a case where the IP address (third address information) is not stored in the batch server list information DB 122, the web service batch task/online task determining unit 111c determines that the task type is an online process. A specific process of determining a web service batch task (pattern D: the task (a3) described above) or an online task (pattern A) using the web service batch task/online task determining unit 111c will be described later with reference to FIGS. 21 and 25.

The resource control unit 112 controls resources allocated to the servers 1a to 1d based on a result of the determination made by the determination unit 111 (in other words, based on whether the type of the task to be executed by the task system 1 is an online task or a batch task). For example, in a case where the task to be executed is an online task, the resource control unit 112 performs control such that the technique (b2) described above is applied to the task system 1. On the other hand, in a case where the task to be executed is a batch task, the resource control unit 112 performs control such that the application of the technique (b2) is cancelled. In this way, even when the processing capacity of the server/resources is used to a maximal degree in a batch task, it can be suppressed that scale-out/scale-up are endlessly repeated until the batch task is completed.

[3] Specific Function and Operation of the Present Embodiment

Next, specific functions and operations (processes) of the task system 1 and the management server 100 according to the present embodiment will be described with reference to FIGS. 7 to 35.

[3-1] Flow of Process According to Technique for Determining Task Type According to the Present Embodiment The flow of the process according to the technique for determining the task type according to the present embodiment will be described with reference to arrows A1 to A12 illustrated in FIG. 7.

The DB information collecting unit 11c acquires the SQL information of the DB server 1c on a regular basis. When a new SQL access occurs, the DB information collecting unit 11c transfers the SQL information, the process information, and the network information to the local batch task determining unit 111a (see arrow A1). In addition, the operation of the DB information collecting unit 11c and the SQL information, the process information, and the network information collected by the DB information collecting unit 11c will be described later with reference to FIGS. 8 to 11.

The local batch task determining unit 111a determines whether the task (determination target task) corresponding to the SQL is a local batch task or one of the other tasks based on whether the process has been added to the DB server 1c at the time of issuing the SQL (see Sequence 11 described above and criterion I illustrated in FIG. 2). In a case where the process has been added to the DB server 1c at the time of issuing the SQL, the local batch task determining unit 111a determines the task that is a determination target as a local batch task (pattern B: batch task (a1)). Then, the local batch task determining unit 111a stores the SQL and the task information "batch" that is a result of the determination in the SQL/task type history DB 121 (see arrow A2). In addition, the local batch task determining unit 111a acquires the IP address of the batch server 1d that is the SQL issuance source and stores the acquired IP address in the batch server list information DB 122 (see arrow A3). On the other hand, in a case where the process has not been added, the local batch task determining unit 111a determines the task, which is the determination target, as a task other than the local batch task, and the process proceeds to the process of the remote batch task determining unit 111b (see arrow A4). According to the process described up to here, the task that is a determination target is determined not to be a local batch task and is one of the web service batch task and the online task.

The remote batch task determining unit 111b acquires the IP address of the AP server 1b or the batch server 1d that has issued the SQL from the network information of the DB server 1c delivered from the local batch task determining unit 111a. In this step, the remote batch task determining unit 111b is not able to determine whether the server that has issued the SQL is the AP server 1b or the batch server 1d. Thus, in order to determine whether the SQL issuance source server is the AP server 1b or the batch server 1d, the remote batch task determining unit 111b requests the AP server 1b or the batch server 1d that is designated by the acquired IP address to collect the process information and the network information (see arrows A5 and A6).

The AP information collecting unit 11b or the batch information collecting unit 11d of the AP server 1b or the batch server 1d that has received the request collects the process information (including the resource use status of the process) and the network information of the AP server 1b or the batch server 1d and notifies the remote batch task determining unit 111b of the collected information (arrows A5 and A6).

The remote batch task determining unit 111b refers to the process information of which it was notified and determines whether the task that is a determination target is a remote batch task or one of the other tasks based on the resource use characteristics of the process that has issued the SQL (see Sequences 23 and 24 and criterion II illustrated in FIG. 2).

In a case where the task that is a determination target is determined as a remote batch task, the remote batch task determining unit 111b stores the SQL and the task type information "batch" that is a result of the determination in the SQL/task type history DB 121 (see arrow A7). In addition, the remote batch task determining unit 111b stores the IP address of the batch server 1d that is the SQL issuance source in the batch server list information DB 122 (see arrow A8). On the other hand, in a case where the task that is a determination target is determined as a task other than the remote batch task, the remote batch task determining unit 111b determines that the task that is a determination target is determined as a task other than the remote batch task, and the process proceeds to the process of the web service batch task/online task determining unit 111c (see arrow A9). According to the process described up to here, the task that is a determination target is determined to be neither the local batch task nor the remote batch task and is one of the web service batch task and the online task.

Then, the web service batch task/online task determining unit 111c acquires the IP address (second address information) acquired by the remote batch task determining unit 111b as the IP address of the AP server 1b. The web service batch task/online task determining unit 111c detects the IP address (third address information) of the SQL issuance source server based on the acquired IP address of the AP server 1b, the SQL delivered from the remote batch task determining unit 111b, and the acquired network information of the web server 1a that is acquired through the web information collecting unit 11a. Then, the web service batch task/online task determining unit 111c determines whether the task that is a determination target is a web service batch task or an online task based on whether the detected IP address is included in the batch server list information DB 122 (arrows A10 and A11; see Sequences 33 to 35 and the criterion III illustrated in FIG. 2). In a case where the detected IP address is included in the batch server list information DB 122, and the task that is a determination target is determined as a web service batch task, the web service batch task/online task determining unit 111c stores the SQL and the task type information "batch" that is a result of the determination in the SQL/task type history DB 121 (see arrow A12). On the other hand, in a case where the detected IP address is not included the batch server list information DB 122, and the task that is a determination target is determined as an online task, the web service batch task/online task determining unit 111c stores the SQL and the task type information "online" as a result of the determination in the SQL/task type history DB 121 (see arrow A12).

[3-2] Function and Operation of DB Information Collecting Unit

Figure 8:
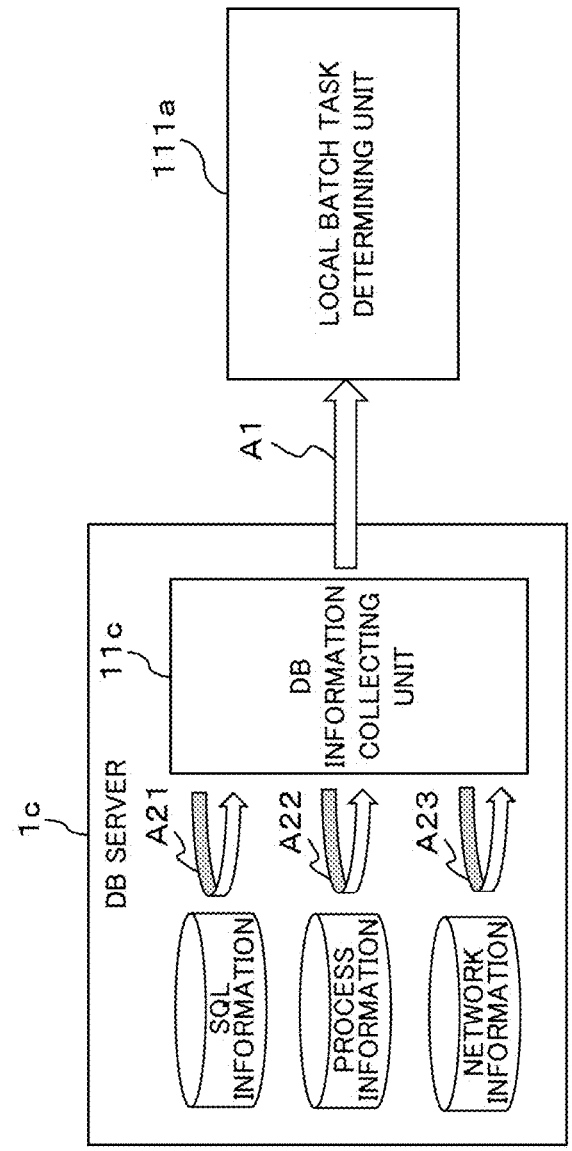
FIG. 8 is a diagram that illustrates the function and the operation of a DB information collecting unit illustrated in FIG. 6.

Next, the function and the operation of the DB information collecting unit 11c and the SQL information, the process information, and the network information acquired by the DB information collecting unit 11c will be described more specifically with reference to FIGS. 8 to 11. FIG. 8 is a diagram that illustrates the function and the operation of the DB information collecting unit 11c. FIG. 9 is a diagram that illustrates an example of the SQL information acquired by the DB information collecting unit 11c. FIG. 10 is a diagram that illustrates an example of the process information acquired by the DB information collecting unit 11c. FIG. 11 is a diagram that illustrates an example of the network information acquired by the DB information collecting unit 11c.

The DB information collecting unit 11c executes operations (c1) to (c3) described below.

(c1) The DB information collecting unit 11c collects the following information (c21) and (c12) in the DB server 1c on a regular basis.

(c21) The SQL information is collected from an audit log or the like of the RDBMS (see arrow A21 illustrated in FIG. 8).

(c12) The process information is collected from the OS of the DB server 1c by using a ps command of the OS (see arrow A22 illustrated in FIG. 8).

(c2) The DB information collecting unit 11c collects the following information (c21) to (c23) in the DB server 1c when a new SQL log is added to the SQL information.

(c21) The SQL information is collected from an audit log or the like of the RDBMS (see arrow A21 illustrated in FIG. 8).

(c22) The process information is collected from the OS of the DB server 1c by using the ps command or the like of the OS (see arrow A22 illustrated in FIG. 8).

(c23) The network information is collected from the OS of the DB server 1c by using a netstat command of the OS (see arrow A23 illustrated in FIG. 8).

(c3) The DB information collecting unit 11c notifies the local batch task determining unit 111a of the following information (c31) to (c33) that is collected and acquired in (c1) and (c2) described above (see arrow A1 illustrated in FIG. 8).

(c31) SQL information of RDBMS (the SQL information before and after the addition of a new SQL log)

(c32) Process Information of OS (the process information before and after the addition of a new SQL log)

(c33) Network Information of OS (the network information after the addition of a new SQL log)

In addition, in (c11) and (c21) described above, the SQL information as illustrated in FIG. 9 is collected for each SQL from the audit log or the like of the RDBMS stored in the DB server 1c. In the example illustrated in FIG. 9, as the SQL information, information acquisition time, a process ID, a session ID, an SQL statement, the processing start time of the SQL, and the processing end time of the SQL are included.

In (c12) and (c22) described above, the process information as illustrated in FIG. 10 is collected for each process from the OS of the DB server 1c by using the ps command or the like of the OS. In the example illustrated in FIG. 10, as the process information, information acquisition time, a used process name, a process ID, a session ID, a CPU usage rate (%), a memory usage rate, and the number of threads are included.

In addition, in (c23) described above, the network information as illustrated in FIG. 11 is collected from the OS of the DB server 1c by using the netstat command of the OS. In the example illustrated in FIG. 11, as the network information, information acquisition time, an executed process name, a process ID, a local address, and an external address are included.

[3-3] Function and Operation of Local Batch Task Determining Unit

Figure 12:
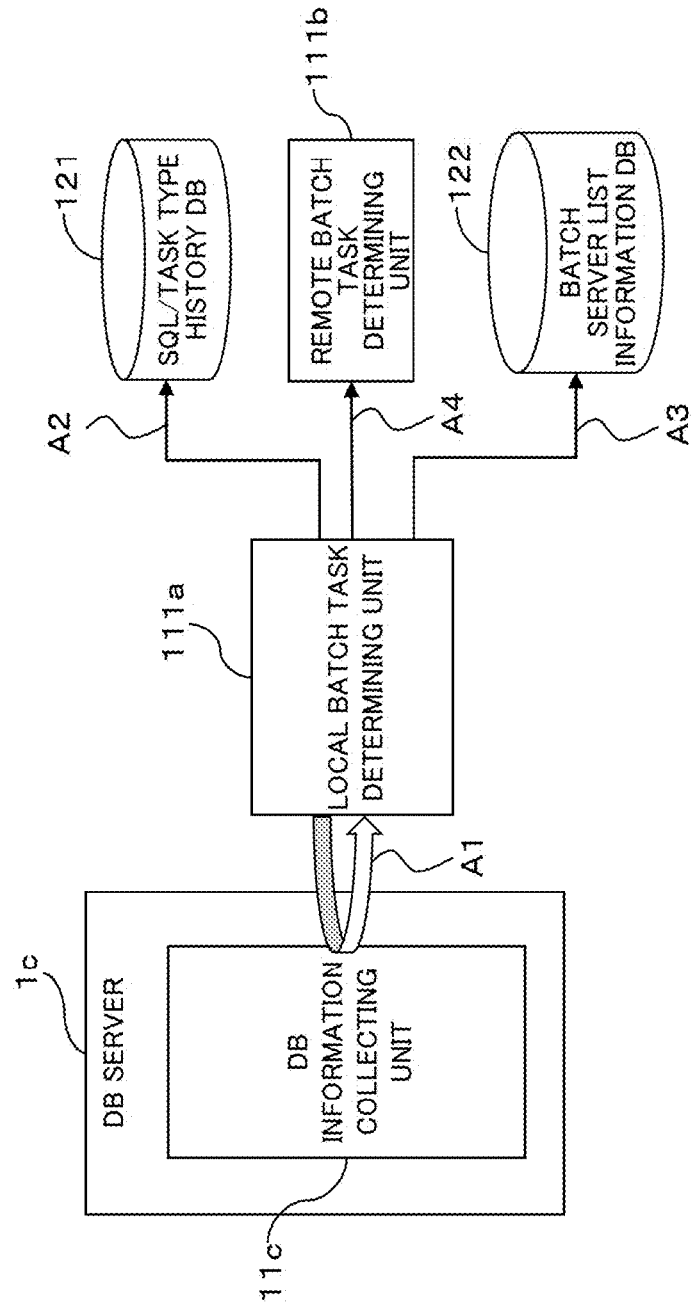
FIG. 12 is a diagram that illustrates the function and the operation of a local batch task determining unit illustrated in FIG. 6.

Next, the function and the operation of the local batch task determining unit 111a will be described more specifically with reference to FIGS. 12 to 16. FIG. 12 is a diagram that illustrates the function and the operation of the local batch task determining unit 111a. FIG. 13 is a diagram that illustrates a storage process for the SQL/task type history DB 121. FIG. 14 is a diagram that illustrates an example of information stored in the SQL/task type history DB 121.

Figure 15:
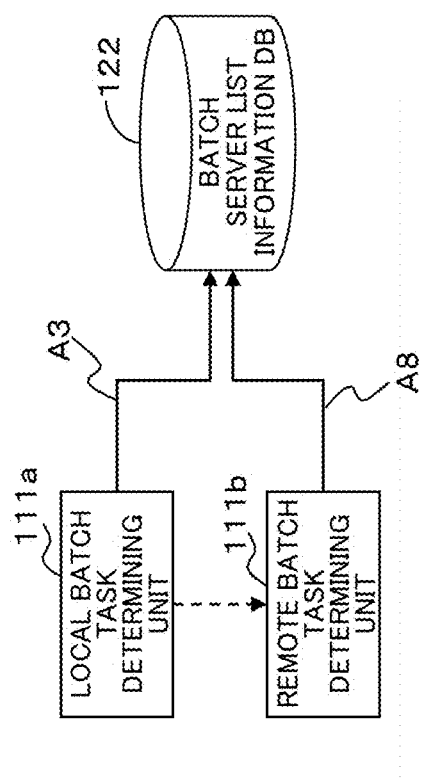
FIG. 15 is a diagram that illustrates a storage process for a batch server list information DB illustrated in FIG. 6.
Figure 16:
FIG. 16 is a diagram that illustrates an example of information stored in the batch server list information DB illustrated in FIG. 6.

FIG. 15 is a diagram that illustrates a storage process for the batch server list information DB 122. FIG. 16 is a diagram that illustrates an example of information stored in the batch server list information DB 122.

The local batch task determining unit 111a executes the following operations (d1) to (d5).

(d1) The local batch task determining unit 111a receives the SQL information of the RDBMS, the process information of the OS, and the network information of the OS from the DB information collecting unit 11c (see arrow A1 illustrated in FIG. 12).

(d2) The local batch task determining unit 111a acquires the issuance source process ID of an added SQL from the SQL information of the RDBMS.

(d3) The local batch task determining unit 111a determines whether or not the process ID acquired in (d2) described above is present in the process information of the OS by referring to the process information of the OS acquired from the DB information collecting unit 11c.

(d4) In a case where the process ID is present, the local batch task determining unit 111a determines that the task that is a determination target is a local batch task and stores the SQL and the task type information "batch" that is a result of the determination in the SQL/task type history DB 121 (see arrow A2 illustrated in FIG. 12). In addition, the local batch task determining unit 111a acquires the IP address of the remote batch server 1d that has issued a request for a local batch task based on the SQL information and the network information and stores the acquired IP address in the batch server list information DB 122 (see arrow A3 illustrated in FIG. 12).

(d5) In a case where the process ID is not present, in other words, in a case where the process has not been added, the local batch task determining unit 111a determines that the task that is a determination target is a task other than the local batch task. Then, the local batch task determining unit 111a notifies the remote batch task determining unit 111b of the various kinds of information that have been acquired and transfers a determination to the remote batch task determining unit 111b (see arrow A4 illustrated in FIG. 12).

In addition, in a case where the task type is determined as a batch task or an online task by the local batch task determining unit 111a, the remote batch task determining unit 111b, and the web service batch task/online task determining unit 111c, information as illustrated in FIG. 14 is stored in the SQL/task type history DB 121 (see arrows A2, A7, and A12 illustrated in FIG. 13). In other words, in the SQL/task type history DB 121, the SQL information, the result (batch task/online task) of the determination of the task type, and the IP address of the SQL issuance source server are stored for each SQL. As the SQL information, as illustrated in FIG. 9, information acquisition time, a process ID, a session ID, an SQL statement, the process start time of the SQL and the processing end time of the SQL are included.

In addition, in a case where the task type is determined as a batch task by the local batch task determining unit 111a and the remote batch task determining unit 111b, information as illustrated in FIG. 16 is stored in the batch server list information DB 122 (see arrows A3 and A8 illustrated in FIG. 15). In other words, in the batch server list information DB 122, registration date and time, the IP address of the batch server that has issued the request for the task determined as a batch task, and latest update date and time are stored. In a case where the IP address of the batch server that is transmitted from the local batch task determining unit 111a and the remote batch task determining unit 111b to the batch server list information DB 122 is new, a new record is added to the batch server list information DB 122, and a new IP address is registered in the added record. On the other hand, in a case where the IP address is not new (in the case of duplicate IP addresses), the latest update date and time of a record in which the IP address is registered is updated.

Figure 17:
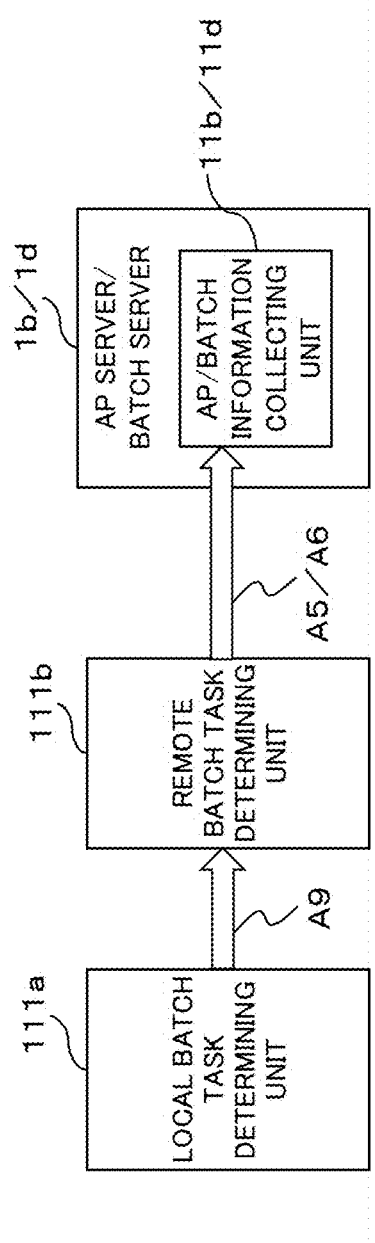
FIG. 17 is a diagram that illustrates the function and the operation of a remote batch task determining unit illustrated in FIG. 6.
Figure 19:
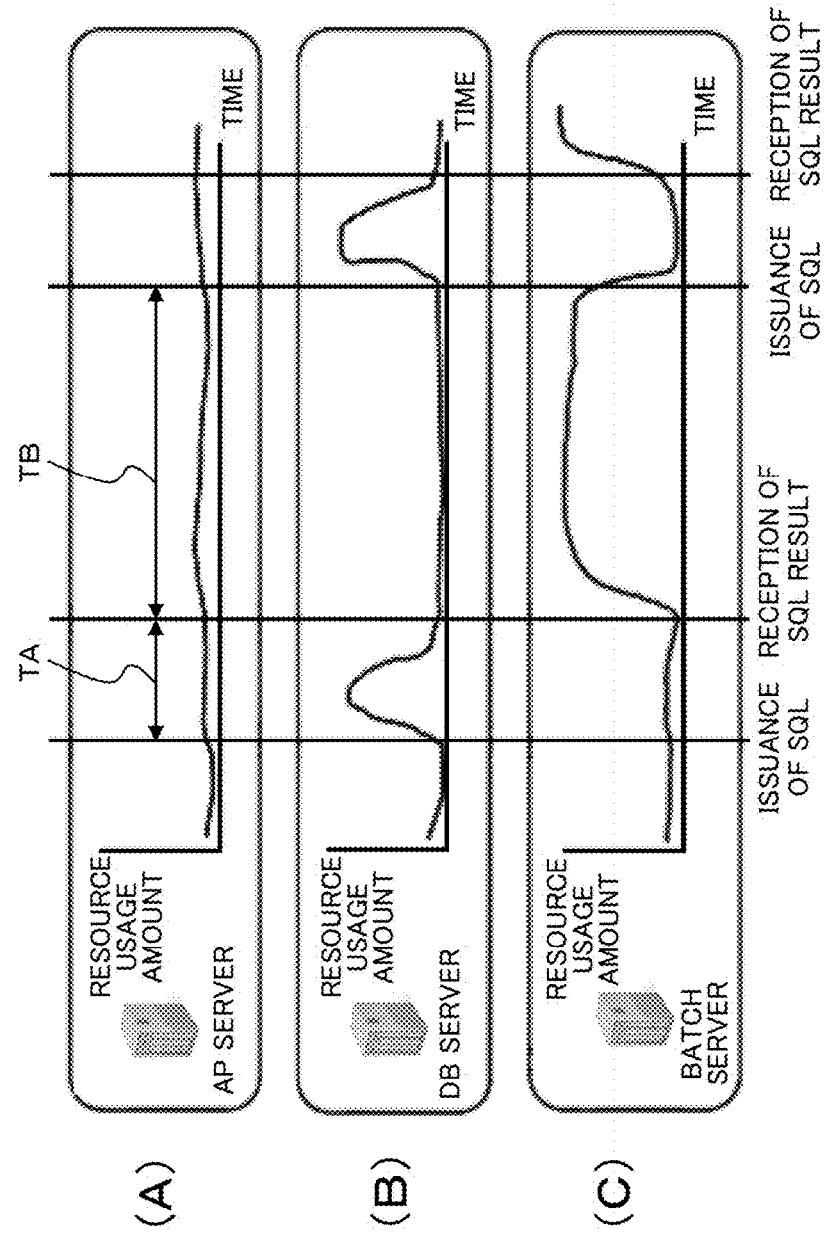
FIG. 19 is a diagram that illustrate a determination criterion of the remote batch task determining unit illustrated in FIG. 6.

[3-4] Function and Operation of Remote Batch Task Determining Unit and AP Information Collecting/Batch Information Collecting Unit Next, the functions and the operations of the remote batch task determining unit 111*b* and the AP information collecting unit 11*b*/the batch information collecting unit 11*d* will be described more specifically with reference to FIGS. 17 to 20. FIGS. 17 and 20 are diagrams that illustrate the function and the operation of the remote batch task determining unit 111*b*. FIG. 18 is a diagram that illustrates the function and the operation of the AP information collecting unit 11*b* or the batch information collecting unit 11*d*. FIG. 19 is a diagram that illustrate determination criteria of the remote batch task determining unit 111*b*.

The remote batch task determining unit 111*b*, first, executes the following operations (e1) to (e3).

(e1) The remote batch task determining unit 111*b* specifies a successive SQL that is issued in a session to which the SQL belongs based on the SQL information and acquires the previous SQL start time, the previous SQL end time and the start time of the SQL that has been newly issued.

(e2) The remote batch task determining unit 111*b* acquires the IP address of the server that has remotely issued the SQL based on the SQL information, the process information, and the network information. As described above, at this time point, the remote batch task determining unit 111*b* is not able to determine whether the server that has issued the SQL is the AP server 1*b* or the batch server 1*d*.

(e3) The remote batch task determining unit 111*b*, in order to determine whether the SQL issuance source server is the AP server 1*b* or the batch server 1*d*, notifies the AP server 1*b* or the batch server 1*d*, which is designated by the IP address acquired in (e2) described above, of the information acquired in (e1) described above (see arrows A5/A6 illustrated in FIG. 17). Accordingly, in order to determine whether the SQL issuance source is the AP server 1*b* or the batch server 1*d*, it is requested to collect the process information and the network information in the AP server 1*b* or the batch server 1*d* that is designated by the acquired IP address.

Thereafter, the AP information collecting unit 11*b* or the batch information collecting unit 11*d* executes the following operations (f1) and (f2).

(f1) The AP information collecting unit 11*b* or the batch information collecting unit 11*d* acquires the resource use statuses (the CPU usage rates or the memory usage rates) of the following periods (f11) and (f12) as the process information (processing result information) (see arrow A24 illustrated in FIG. 18). In addition, the AP information collecting unit 11*b* or the batch information collecting unit 11*d* acquires the network information from the OS of the AP server 1*b* or the batch server 1*d* by using a netstat command of the OS (see arrow A25 illustrated in FIG. 18).

(f11) the resource usage amount (first resource usage amount) between the previous SQL start time and the previous SQL end time (during the period TA illustrated in FIG. 19)

As the first resource usage amount, an average value of the resource usage amounts during the period TA may be used.

(f12) the resource usage amount (second resource usage amount) between the end time of the previous SQL and the start time of the current SQL (new SQL) (during the period TB illustrated in FIG. 19)

As the second resource usage amount, an average value of the resource usage amounts during the period TB may be used.

(f2) The AP information collecting unit 11*b* or the batch information collecting unit 11*d* notifies the remote batch task determining unit 111*b* of the process information including the first resource usage amount and the second resource usage amount acquired in (f1) described above and the network information of the AP server 1*b* or the batch server 1*d* (see arrow A5 or A6 illustrated in FIG. 18).

Here, a determination criterion of the remote batch task determining unit 111*b*, in other words, a criterion used for determining whether the task that is a determination target is a remote batch task or one of the other tasks will be described with reference to FIG. 19.

As illustrated in (A) of FIG. 19, the resource usage amount of the process of the AP server 1*b*, commonly, is almost constant regardless of the periods TA and TB. As illustrated in (B) of FIG. 19, in the DB server 1*c*, since the process of an SQL is executed during the period TA, the resource usage amount during the period TA increases, and the resource usage amount of the period TB after the end of the SQL process decreases from the resource usage amount of the period TA. As illustrated in (C) of FIG. 19, in the batch server 1*d*, the DB server 1*c* is in the state of waiting for the process of the SQL during the period TA, and accordingly, the resource usage amount is small. However, after the end of the process of the SQL, the batch process is executed, and accordingly, the resource usage amount of the period TB increases with respect to the resource usage amount of the period TA.

Based on such characteristics of the use status (processing result information) of the resources, the remote batch task determining unit 111*b* can determine the task that is a determination target as a remote batch task in a case where the resource usage amount (second resource usage amount) of the period TB increases with respect to the resource usage amount (first resource usage amount) of the period TA.

Thus, when the remote batch task determining unit 111*b* is notified from the AP information collecting unit 11*b* or the batch information collecting unit 11*d* (see arrows A5 or A6 illustrated in FIG. 20), the remote batch task determining unit 111*b* executes the following operations (e4) to (e6).

(e4) The remote batch task determining unit 111*b* determines whether the task that is a determination target is a remote batch task or one of the other tasks based on the information (the first resource use amount and the second resource usage amount) received from the AP information collecting unit 11*b* or the batch information collecting unit 11*d*. In other words, the remote batch task determining unit 111*b* determines whether or not the second resource usage amount has increased with respect to the first resource usage amount.

(e5) In a case where the second resource usage amount has increased with respect to the first resource usage amount, the remote batch task determining unit 111*b* determines the task that is a determination target as a remote batch task executed by the batch server 1*d*. Then, the remote batch task determining unit 111*b* stores the SQL and the task type information "batch" that is a result of the determination in the SQL/task type history DB 121 (see arrow A7 illustrated in FIG. 20). In addition, the remote batch task determining unit 111*b* acquires the IP address of the batch server 1*d* based on the network information and stores the acquired IP address in the batch server list information DB 122 (see arrow A8 illustrated in FIG. 20).

(e6) In a case where the second resource usage amount has not increased with respect to the first resource usage amount, the remote batch task determining unit 111b determines the task that is a determination target as a task other than the local batch task and the remote batch task. Then, the remote batch task determining unit 111b notifies the web service batch task/online task determining unit 111c of the various kinds of information that has been acquired and transfers a determination to the web service batch task/online task determining unit 111c (see arrow A9 illustrated in FIG. 20).

[3-5] Function and Operation of Web Service Batch Task/Online Task Determining Unit Next, the function and the operation of the web service batch task/online task determining unit 111c will be described more specifically with reference to FIG. 21. FIG. 21 is a diagram that illustrates the function and the operation of the web service batch task/online task determining unit 111c illustrated in FIG. 6.

The web service batch task/online task determining unit 111c executes the following operations (g1) to (g4).

(g1) The web service batch task/online task determining unit 111c acquires the IP address of the SQL issuance source server based on the SQL information and the like (see arrow A9 illustrated in FIG. 21) that are received from the remote batch task determining unit 111b and the network information (see arrow A10 illustrated in FIG. 21) of the web server 1a that is acquired from the web information collecting unit 11a. At this time, based on a combination of a process ID, a local IP address/external IP address, and a port, by tracing the upstream side of the web server 1a, the IP address of the SQL issuance source is detected.

(g2) The web service batch task/online task determining unit 111c compares the IP address of the SQL issuance source server that is detected in (g1) described above with the IP address (see arrow A11 illustrated in FIG. 21) stored in the batch server list information DB 122. In this way, the web service batch task/online task determining unit 111c determines whether or not an address coinciding with the IP address of the SQL issuance source server detected in (g1) described above is stored in the batch server list information DB 122.

(g3) In a case where an IP address coinciding with the IP address of the SQL issuance source server is present, the web service batch task/online task determining unit 111c determines the task that is a determination target as a web service batch task executed by the batch server 1d. Then, the web service batch task/online task determining unit 111c stores the SQL and the task type information "batch" that is a result of the determination in the SQL/task type history DB 121 (see arrow A12 illustrated in FIG. 21).

(g4) In a case where an IP address coinciding with the IP address of the SQL issuance source server is not present, the web service batch task/online task determining unit 111c determines the task that is a determination target as an online task. Then, the web service batch task/online task determining unit 111c stores the SQL and the task type information "online" that is a result of the determination in the SQL/task type history DB 121 (see arrow A12 illustrated in FIG. 21).

[3-6] Processing Sequence of the Present Embodiment According to Flowchart

Next, the processing sequence according to the present embodiment will be described along flowcharts illustrated in FIGS. 22 to 25.

[3-6-1] Entire Process Executed by Manager

Figure 22:
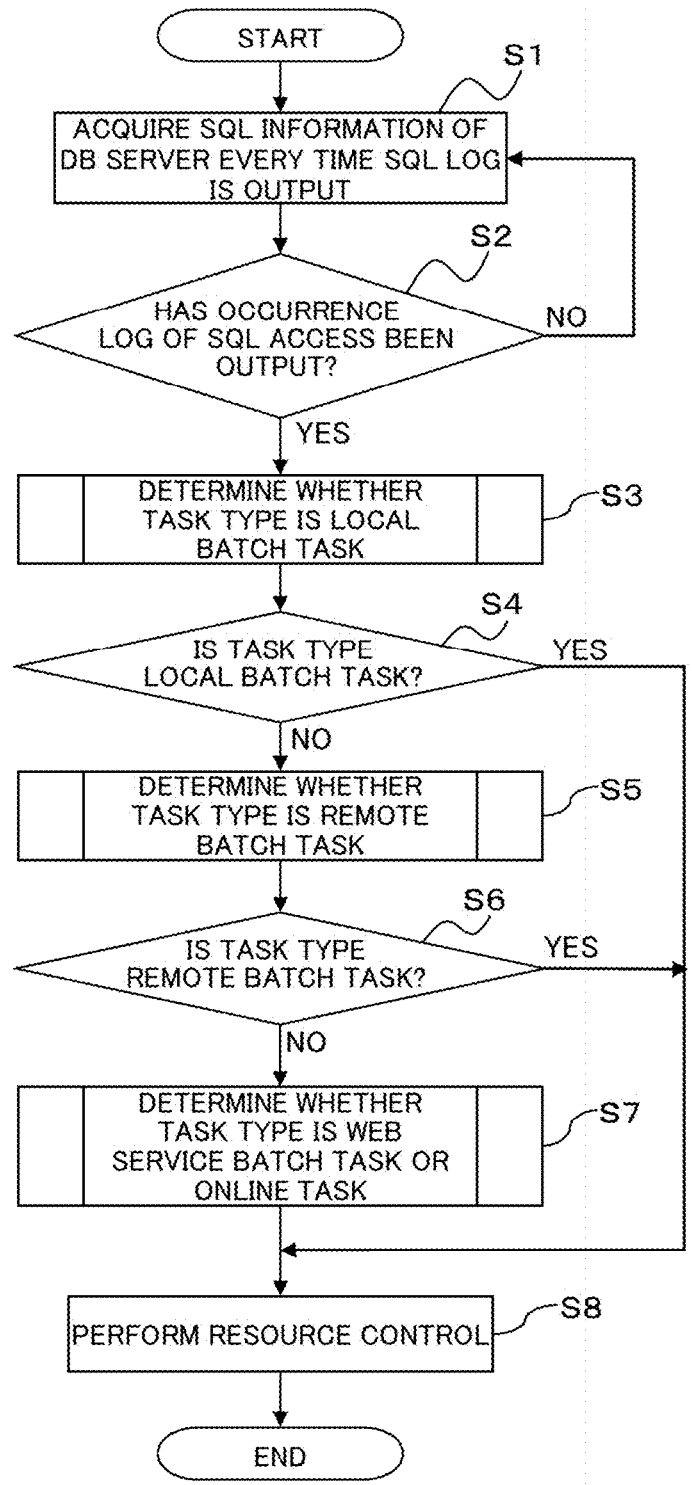
FIG. 22 is a flowchart that illustrates the operation of a manager illustrated in FIG. 6.

First, the operation (entire process) of the manager 101 will be schematically described along the flowchart (steps S1 to S8) illustrated in FIG. 22.

The manager 101 (processing unit 110) acquires the SQL information of the DB server 1c through the DB information collecting unit 11c of the DB server 1c every time an SQL log is output from the DB server 1c in step S1. Thereafter, the manager 101 determines whether or not a log of the occurrence of an SQL access is output in step S2. In a case where the log of the occurrence of the SQL access is not output (NO route of step S2), the manager 101 causes the process to be returned to the process of step S1.

Figure 23:
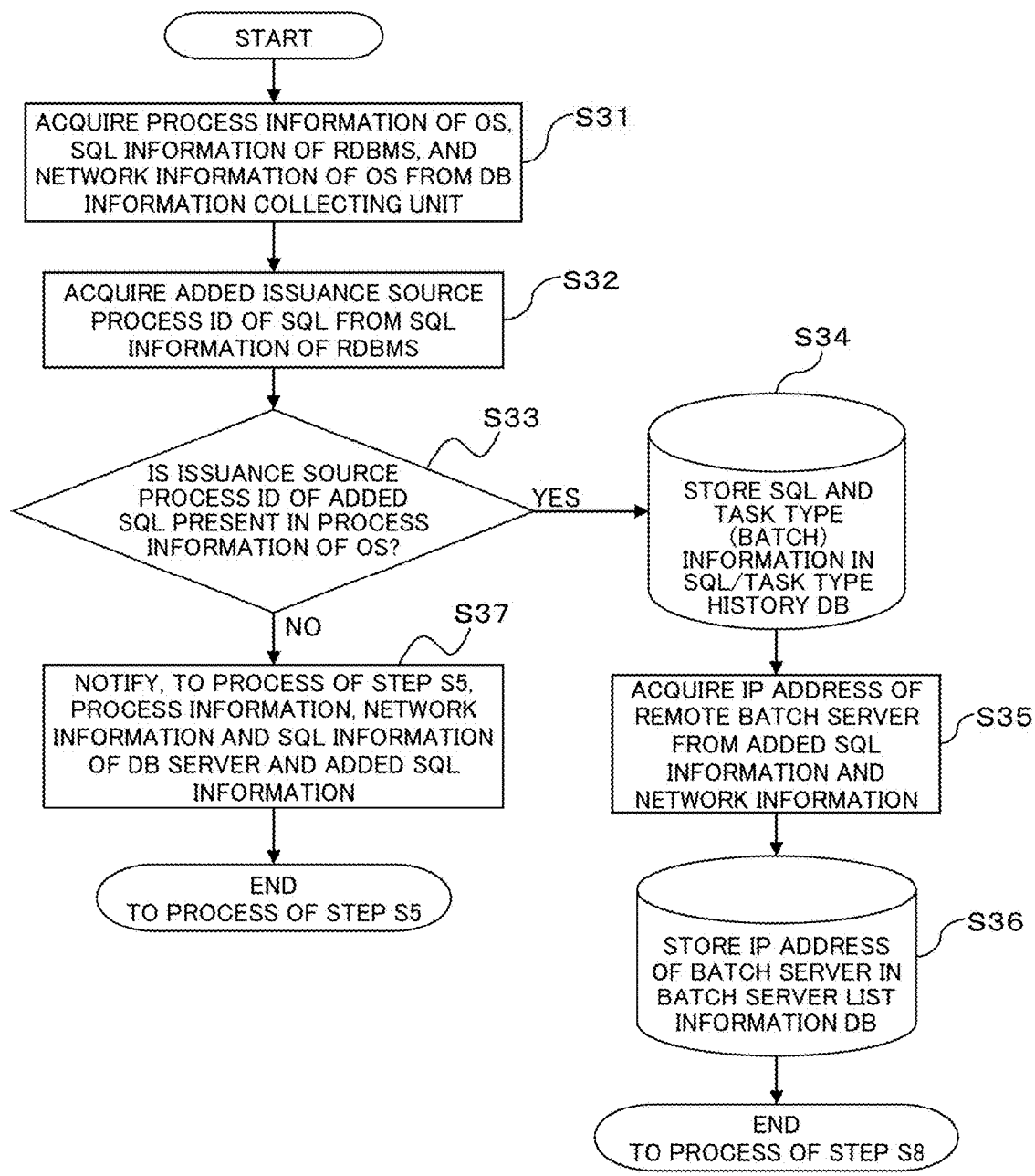
FIG. 23 is a flowchart that illustrates a local batch task determining process of step S3 illustrated in FIG. 22.

In a case where a log of the occurrence of an SQL access is output (YES route in step S2), the manager 101 (the local batch task determining unit 111a) determines whether the task that is a determination target is a local batch task or one of the other tasks in step S3 (see FIG. 23). In a case where the task that is a determination target is a local batch task (YES route of step S4), the manager 101 (the processing unit 110) causes the process to proceed to the process of step S8.

Figure 24:
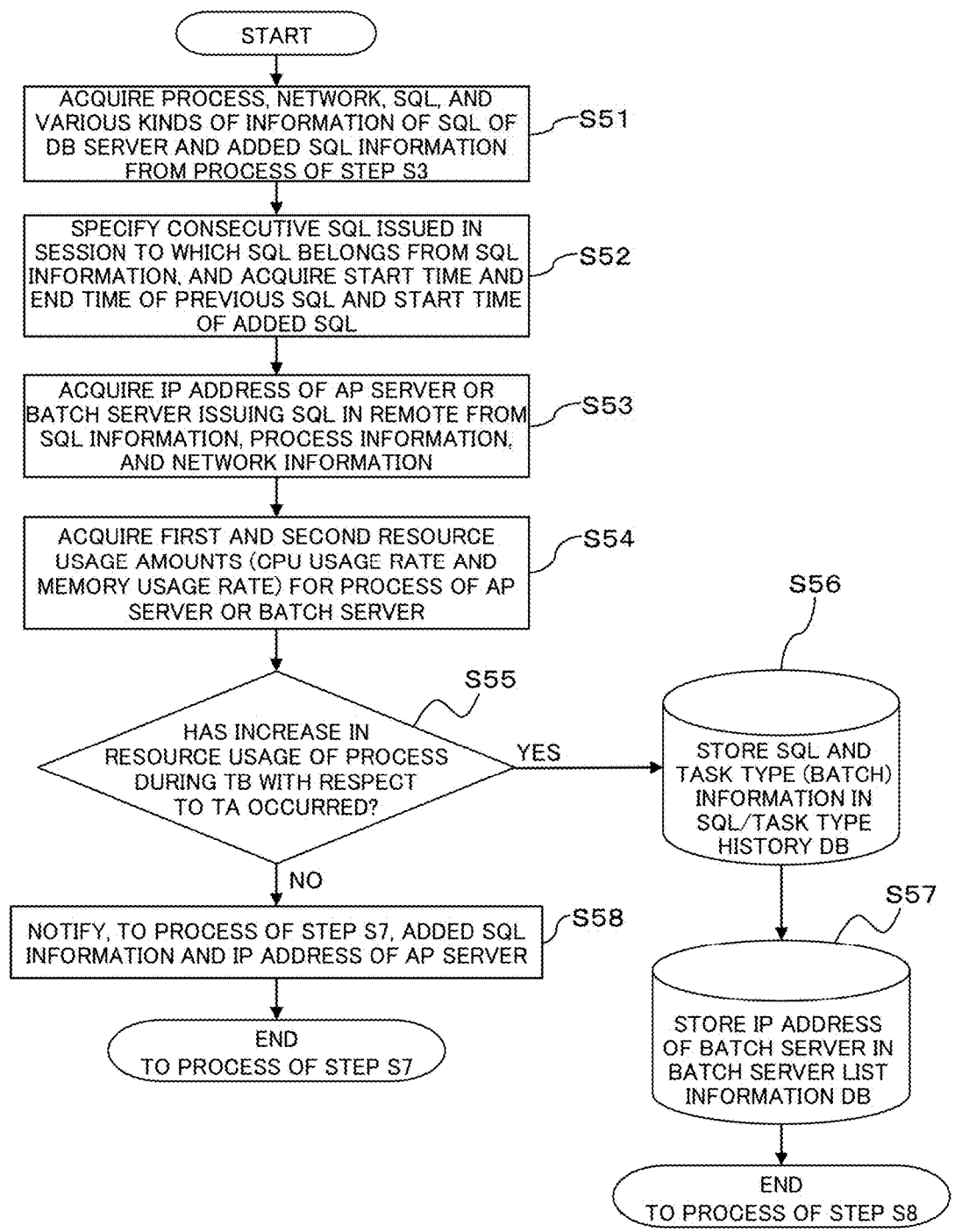
FIG. 24 is a flowchart that illustrates a remote batch task determining process of step S5 illustrated in FIG. 22.

On the other hand, in a case where the task that is a determination target is not a local batch task (NO route of step S4), the manager 101 (the remote batch task determining unit 111b) determines whether the task that is a determination target is a remote batch task or one of the other tasks in step S5 (see FIG. 24). In a case where the task that is a determination target is a remote batch task (YES route of step S6), the manager 101 (the processing unit 110) causes the process to proceed to the process of step S8.

Figure 25:
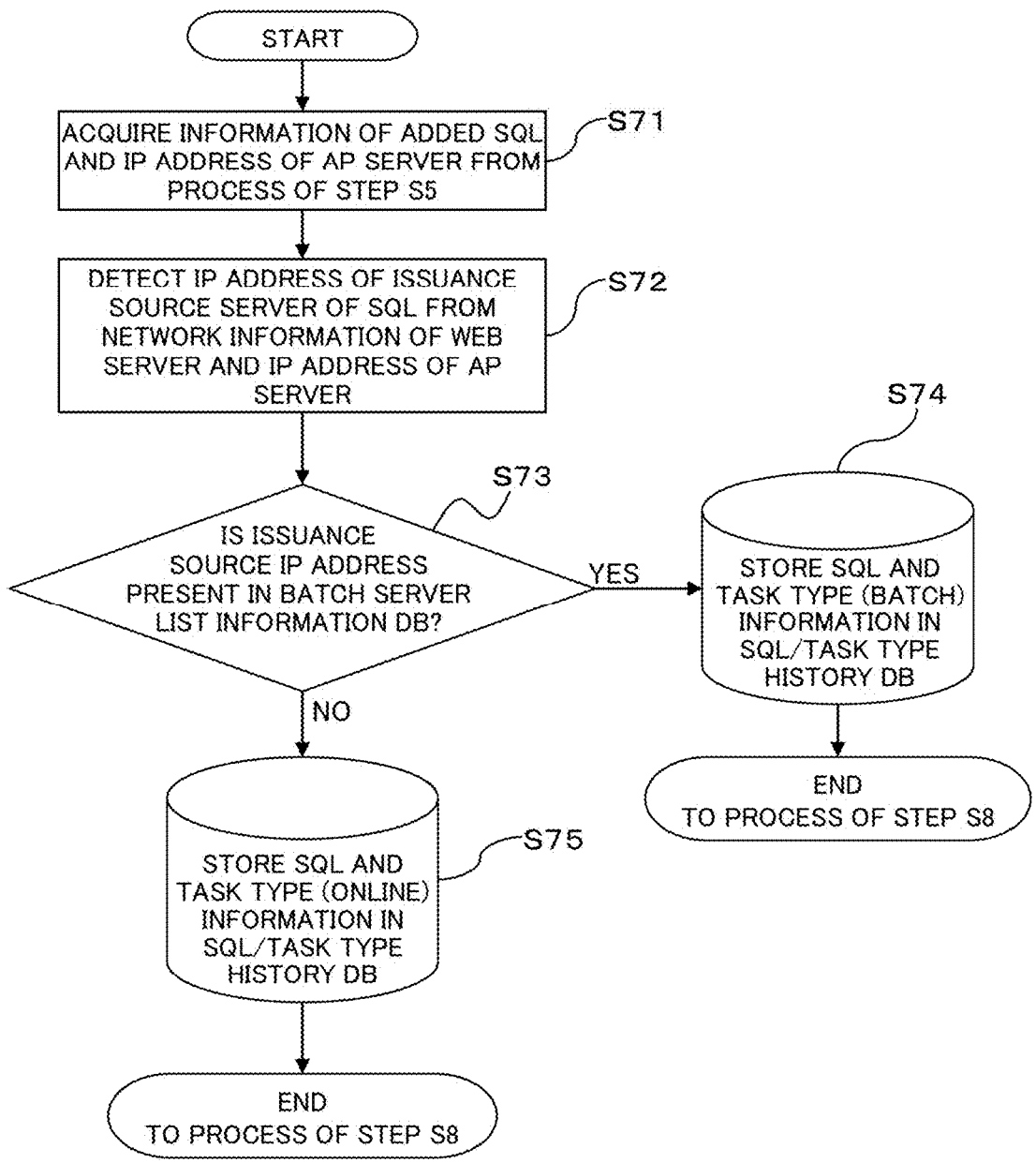
FIG. 25 is a flowchart that illustrates the web service batch task/online task determining process of step S7 illustrated in FIG. 22.
Figure 36:
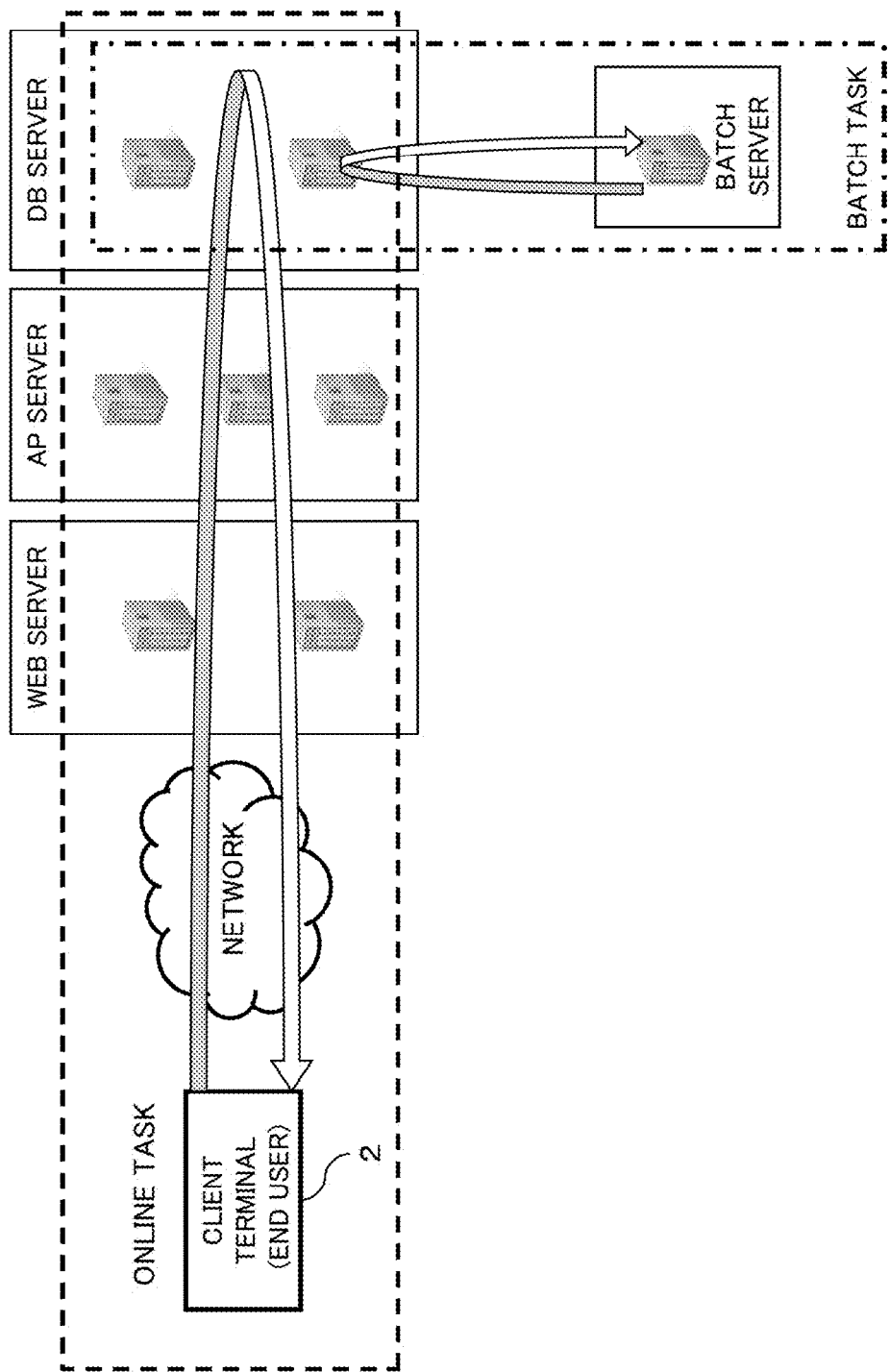
FIG. 36 is a diagram that illustrates a configuration example of a task system.
Figure 37:
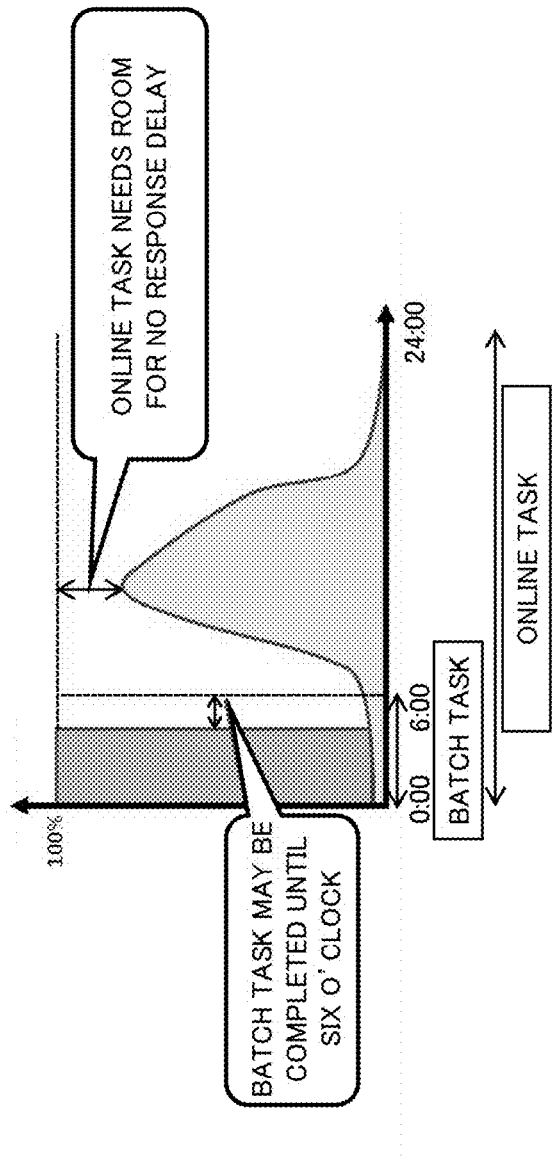
FIG. 37 is a diagram that illustrates an example of the resource use status of a database server.
Figure 38:
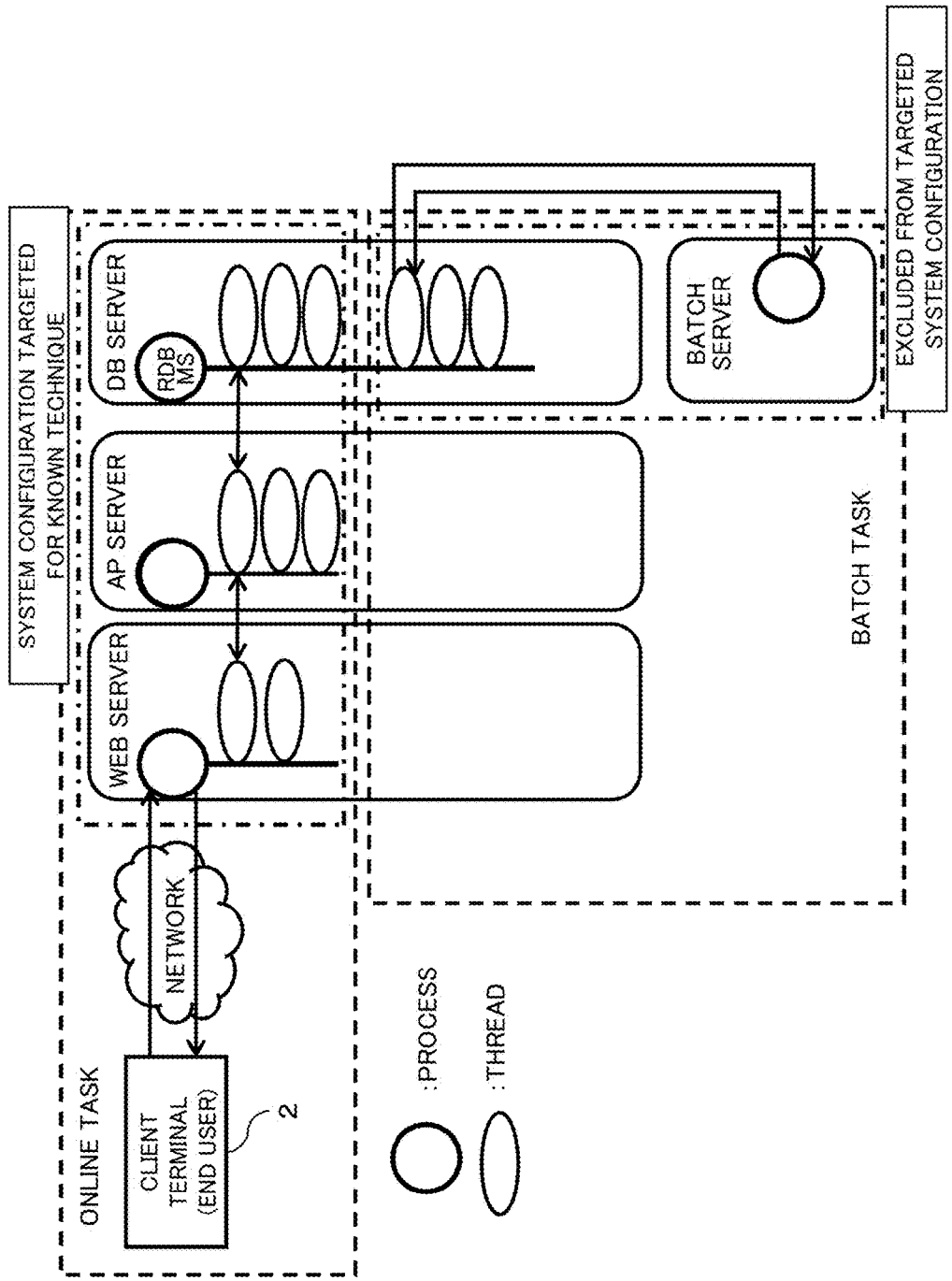
FIGS. 38 and 39 are diagrams that illustrate problems in a known technique.

In a case where the task that is a determination target is not a remote batch task (NO route of step S6), the manager 101 (the web service batch task/online task determining unit 111c) determines whether the task that is a determination target is a web service batch task or an online task in step S7 (see FIG. 25).

When the task that is a determination target is determined as a batch task or an online task as above, the manager 101 (the resource control unit 112) controls resources allocated to the task system 1 (servers 1a to 1d) based on a result of the determination made by the determination unit 111 in step S8. In other words, resource control (auto-scale) according to whether the type of the task to be executed by the task system 1 is an online task or a batch task is executed.

[3-6-2] Local Batch Task Determining Process

Next, the local batch task determining process of step S3 illustrated in FIG. 22 will be described along the flowchart (steps S31 to S37) illustrated in FIG. 23.

First, the local batch task determining unit 111a acquires the process information of the OS, the SQL information of the RDBMS, and the network information of the OS through the DB information collecting unit 11c of the DB server 1c in step S31.

When the information is acquired from the DB information collecting unit 11c, the local batch task determining unit 111a acquires the issuance source process ID of the added SQL from the SQL information of the RDBMS in step S32.

Then, the local batch task determining unit 111a determines whether or not the process ID acquired in step S32 is present in the process information of the OS by referring to the process information of the OS that is acquired by the DB information collecting unit 11c in step S33.

In a case where the process ID is present (YES route of step S33), the local batch task determining unit 111a determines the task that is a determination target as a local batch task and stores the SQL and the task type information "batch" as a result of the determination in the SQL/task type history DB 121 in step S34. In addition, the local batch task determining unit 111*a* acquires the IP address of the remote batch server 1*d* that has issued the request for a local batch task based on the information of the added SQL and the network information in step S35 and stores the acquired IP address in the batch server list information DB 122 in step S36. Thereafter, the manager 101 causes the process to proceed to the process of step S8 (see YES route of step S4 illustrated in FIG. 22).

On the other hand, in a case where the process ID is not present, in a case where the process has not been added (NO route of step S33), the local batch task determining unit 111*a* determines the task that is a determination target as a task other than a local batch task. Then, the local batch task determining unit 111*a* notifies the process of step S5, in other words, the remote batch task determining unit 111*b* of the process information of the DB server 1*c*, the network information, the SQL information and the added SQL information in step S37. Thereafter, the manager 101 causes the process to proceed to the process of step S5 (see NO route of step S4 illustrated in FIG. 22).

[3-6-3] Remote Batch Task Determining Process

Next, the remote batch task determining process of step S5 illustrated in FIG. 22 will be described along the flowchart (steps S51 to S58) illustrated in FIG. 24.

First, the remote batch task determining unit 111*b* acquires the process information of the DB server 1*c*, the network information, the SQL information, and the added SQL information from the process (the local batch task determining unit 111*a*) of step S3 in step S51.

When various kinds of information is acquired, the remote batch task determining unit 111*b* specifies a successive SQL issued in a session to which the SQL belongs based on the SQL information and acquires previous SQL start time, previous SQL end time, and current SQL start time that has been newly issued in step S52.

In addition, the remote batch task determining unit 111*b* acquires the IP address of the server that has remotely issues the SQL based on the SQL information, the process information, and the network information in step S53.

Then, the remote batch task determining unit 111*b* acquires the first resource usage amount and the second resource usage amount described above with reference to FIG. 19 using the AP information collecting unit 11*b* or the batch information collecting unit 11*d* from the AP server 1*b* or the batch server 1*d*, which is designated by the IP address acquired in step S53, in step S54. Here, as described above, the first resource usage amount is a resource usage amount between the start time and the end time of the previous SQL (during the period TA illustrated in FIG. 19). In addition, the second resource usage amount is a resource usage amount between the end time of the previous SQL and the start time of the current SQL (new SQL) (during the period TB illustrated in FIG. 19).

The remote batch task determining unit 111*b* determines whether the task that is a determination target is a remote batch task or one of the other tasks based on the first and second resource amounts received from the AP information collecting unit 11*b* or the batch information collecting unit 11*d*. In other words, the remote batch task determining unit 111*b* determines whether or not the second resource usage amount of the process of the period TB has increased with respect to the first resource usage amount of the process of the period TA in step S55.

In a case where the second resource usage amount has increased with respect to the first resource usage amount (YES route of step S55), the remote batch task determining unit 111*b* determines that the task that is a determination target as a remote batch task executed by the batch server 1*d*. Then, the remote batch task determining unit 111*b* stores the SQL and the task type information "batch" that is a result of the determination in the SQL/task type history DB 121 in step S56. In addition, the remote batch task determining unit 111*b* acquires the IP address of the batch server 1*d* based on the network information and stores the acquired IP address in the batch server list information DB 122 in step S57. Thereafter, the manager 101 causes the process to proceed to the process of step S8 (see YES route of step S6 illustrated in FIG. 22).

On the other hand, in a case where the second resource usage amount has not increased with respect to the first resource usage amount (NO route of step S55), the remote batch task determining unit 111*b* determines the task that is a determination target as a task other than the local batch task and the remote batch task. Then, the remote batch task determining unit 111*b* notifies the process of step S7, in other words, the web service batch task/online task determining unit 111*c* of the added SQL information and the IP address of the AP server 1*b* acquired in step S53, in step S58. The manager 101 causes the process to proceed to the process of step S7 (see NO route of step S6 illustrated in FIG. 22).

[3-6-4] Web Service Batch Task/Online Task Determining Process

Next, the web service batch task/online task determining process of step S7 illustrated in FIG. 22 will be described along the flowchart (steps S71 to S75) illustrated in FIG. 25.

The web service batch task/online task determining unit 111*c* acquires the added SQL information and the IP address of the AP server 1*b* from the process (the remote batch task determining unit 111*b*) of step S5 in step S71.

The web service batch task/online task determining unit 111*c* acquires the IP address of the SQL issuance source server based on the IP address of the AP server 1*b* and the network information of the web server 1*a* acquired through the web information collecting unit 11*a* in step S72.

Then, the web service batch task/online task determining unit 111*c* determines whether or not an address coinciding with the IP address of the SQL issuance source server detected in step S72 is stored in the batch server list information DB 122 in step S73.

In a case where an IP address coinciding with the IP address of the SQL issuance source server is stored (YES route of step S73), the web service batch task/online task determining unit 111*c* determines the task that is a determination target as a web service batch task executed by the batch server 1*d*. Then, the web service batch task/online task determining unit 111*c* stores the SQL and the task type information "batch" that is a result of the determination in the SQL/task type history DB 121 in step S74. Thereafter, the manager 101 causes the process to proceed to the process of step S8.

In a case where an IP address coinciding with the IP address of the SQL issuance source server is not stored (NO route of step S73), the web service batch task/online task determining unit 111*c* determines the task that is a determination target as an online task. Then, the web service batch task/online task determining unit 111*c* stores the SQL and the task type information "online" that is a result of the determination in the SQL/task type history DB 121 in step S75. Thereafter, the manager 101 causes the process to proceed to the process of step S8.

[3-7] Operation of Specific Example

Next, a determination operation according to the present embodiment will be described more specifically with reference to FIGS. 26 to 35.

[3-7-1] Local Batch Task Determining Process

First, the local batch task determining process according to the present embodiment will be described more specifically with reference to FIGS. 26 to 28. FIG. 26 is a diagram that illustrates an example of the SQL information, FIG. 27 is a diagram that illustrates an example of the process information, and FIG. 28 is a diagram that illustrates an example of the network information.

As illustrated in FIG. 26, in a case where new SQL information is added as a record R1, the local batch task determining unit 111a searches the process information illustrated in FIG. 27 by using a process ID "2483" of the record R1 and the processing start time "2013/07/10_17:41:56" of the SQL as keys.

In the example illustrated in FIG. 27, since a record R2 is hit, the local batch task determining unit 111a determines the task that is a determination target as a local batch task. Then, the local batch task determining unit 111a searches the network information illustrated in FIG. 28 by using a process ID "2483" as a key.

At this time, in the example illustrated in FIG. 28, a record R3 is hit, and the IP address of the remote batch server 1d that has issued a request for a local batch task is acquired from the local address and the external address of the record R3. The acquired IP address is registered in the batch server list information DB 122. On the other hand, in a case where there is no hit through the search of the process information, the local batch task determining unit 111a transfers a determination to the remote batch task determining unit 111b.

[3-7-2] Remote Batch Task Determining Process

Next, the local batch task determining process according to the present embodiment will be described more specifically with reference to FIGS. 29 to 31. FIG. 29 is a diagram that illustrates an example of the SQL information, FIG. 30 is a diagram that illustrates an example of the network information, and FIG. 31 is a diagram that illustrates an example of the resource use status (processing result information).

The remote batch task determining unit 111b, based on the SQL information illustrated in FIG. 29, retrieves a record R4 as previous SQL information and retrieves a record R5 as current SQL information through searches. The records R4 and R5 have the same process ID "2483" and correspond to successive SQLs issued in the session to which SQL belongs. At this time, the processing start time the previous SQL "2013/07/10_17:40:51" and the processing end time "2013/07/10_17:40:59" of the previous SQL are acquired from the record R4, and the processing start time "2013/07/10_17:41:56" of the current SQL is acquired from the record R5.

In addition, the remote batch task determining unit 111b searches the network information illustrated in FIG. 30 by using a process ID "2483" as the key. At this time, in the example illustrated in FIG. 30, a record R6 is retrieved, and the IP address of the AP server 1b or the batch server 1d that has remotely issued an SQL is acquired from the local address and the external address of the record R6.

Then, the remote batch task determining unit 111b acquires the resource use status as illustrated in FIG. 31 from the AP server 1b or the batch server 1d that is designated by the IP address acquired from the record R6 illustrated in FIG. 30. At this time, the remote batch task determining unit 111b, after acquiring the resource use status, may be configured to acquire the first resource usage amount and the second resource usage amount based on the resource use status. In addition, the remote batch task determining unit 111b, on the side of the AP information collecting unit 11b or the batch information collecting unit 11d of the AP server 1b or the batch server 1d, may be configured to acquire the first resource usage amount and the second resource usage amount acquired based on the resource use status by the side of the of the AP server 1b or the batch server 1d from the AP information collecting unit 11b or the batch information collecting unit 11d.

In the example illustrated in FIGS. 29 and 31, the resource usage amount between the processing start time "2013/07/10_17:40:51" and the processing end time "2013/07/10_17:40:59" of the previous SQL (during the period TA illustrated in FIG. 19) is the first resource usage amount. In addition, the resource usage amount between the processing end time "2013/07/10_17:40:59" of the previous SQL and the processing start time "2013/07/10_17:41:56" of the current SQL (during the period TB illustrated in FIG. 19) is the second resource usage amount.

Accordingly, based on the resource use status illustrated in FIG. 31, as the first resource usage amounts (the CPU usage rate and the memory usage rate), 35.2% and 320 MB are acquired. In addition, based on the resource use status illustrated in FIG. 31, as the second resource usage amounts (the CPU usage rate and the memory usage rate), values of areas to which reference numerals P1 and P2 are assigned are acquired. In other words, as the second resource usage amounts, for example, average values 35.1% and 305 MB are acquired.

At this time, since the second resource usage amount has not increased with respect to the first resource usage amount, the remote batch task determining unit 111b determines that the task that is a determination target is not a remote batch task executed by the batch server 1d. Then, the remote batch task determining unit 111b notifies the web service batch task/online task determining unit 111c of the IP address acquired from the record R6 illustrated in FIG. 30 as the IP address of the AP server 1b and transfers a determination to the web service batch task/online task determining unit 111c. On the other hand, in a case where the second resource usage amount has increased with respect to the first resource usage amount, the IP address acquired from the record R6 illustrated in FIG. 30 is registered in the batch server list information DB 122 as the IP address of the batch server 1d.

[3-7-3] Web Service Batch Task/Online Task Determining Process

Next, the web service batch task/online task determining process according to the present embodiment will be described more specifically with reference to FIGS. 32 to 34. FIG. 32 is a diagram that illustrates an example of the SQL information, FIG. 33 is a diagram that illustrates an example of the network information, and FIG. 34 is a diagram that illustrates an example of the information stored in the batch server list information DB 122.

The web service batch task/online task determining unit 111c searches the network information illustrated in FIG. 33 that is acquired from the web server 1a by using a process ID "2483" of the record R7 of new SQL information illustrated in FIG. 32 as the key. In the example illustrated in FIG. 33, a record R8 is hit, and "192.168.1.90" is detected as the IP address of the SQL issuance source server.

Then, the web service batch task/online task determining unit 111c searches the batch server list information as illustrated in FIG. 34 by using the detected IP address "192.168.1.90" as the key. In the example illustrated in FIG.

34, since a record R9 is hit, the web service batch task/online task determining unit 111c determines the task that is a determination target as a web service batch task executed by the batch server 1d. On the other hand, in a case where there is no hit when a search of the batch server list information is executed, the web service batch task/online task determining unit 111c determines the task that is a determination target as an online task.

[3-7-4] Output at Time of Ending Determination Process

Next, an example of the output at the time of ending the determination process according to the present embodiment will be described more specifically with reference to FIG. 35. FIG. 35 is a diagram that illustrates an example of the SQL/task type history DB 121 that is output as a result of the determination according to the present embodiment.

In the present embodiment, each of all the tasks is determined to be either an online task or a batch task in units of SQLs. Then, in the SQL/task type history DB 121, for example, as illustrated in FIG. 35, the SQL information, the task type that is a result of the determination, and the IP address of the issuance source server of the processing request (task) are registered in association with each other. Such an SQL/task type history DB 121 is output as a result of the determination according to the present embodiment.

[4] Advantages of the Present Embodiment

According to the present embodiment, for all the task processes operating on the task system 1 including a plurality of the servers 1a to 1d, it can be appropriately determined whether the main task using the DB server 1c is either an online task or a batch task. Accordingly, the operation according to the characteristics of the task such as changing a scaling method according to the type of the main task, which has been difficult to respond, can be executed. In other words, appropriate scaling can be automatically performed according to the timing for switching between tasks or the characteristics of the task. Accordingly, the system can be operated at low cost while the capacity thereof is maintained.

In addition, according to the present embodiment, a task can be appropriately determined to be either an online task or a batch task in an automatic manner based on general information (the SQL information, the process information, and the network information) that can be acquired from the OS or the like. Accordingly, as described above, not only auto-scaling according to the characteristics of a task is realized, but also, even when there is no linkage information of middleware or information representing that the used server is for an online task or a batch task, a determination of an online task or a batch task can be appropriately made. In other words, according to the present embodiment, without requiring special information, the task type of a request issuance source for the DB server 1c can be appropriately determined in an automatic manner based on information that can be observed from the appearances.

Furthermore, according to the present embodiment, for a batch task, a local batch task, a remote batch task, and a web service batch task can be determined. Since a technique for executing a batch task through a web service is a newly established technique, according to a known technique, a web service batch task and an online task are not discriminated from each other, and the determination of an online task or a batch task is not able to be made. According to the present embodiment, since the transmission source (the SQL issuance source server) of a task can be traced, the above-described technique can be responded as well, whereby the task type can be accurately determined.

In addition, according to the present embodiment, the resource control unit 112 can control resources allocated to the servers 1a to 1d based on whether the task type is an online task or a batch task. Accordingly, for example, in a case where a task to be executed is an online task, the resource control unit 112 can perform control such that the technique (b2) described above is applied to the task system 1. On the other hand, in a case where a task to be executed is a batch task, the resource control unit 112 can perform control such that the application of the technique (b2) described above is cancelled. Thus, even when the processing capacity of the server/resources is used to a maximal degree in a batch task, a repeat of endless scale-out/scale-up until the completion of the batch task can be assuredly suppressed.

[5] Others

As above, while preferred embodiments of the present invention have been described in detail, the present invention is not limited thereto, but various modifications or changes may be made therein in a range not departing from the concept of the present invention.

According to an embodiment, the type of a processing request can be appropriately determined.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a control program that causes a computer to execute a process comprising:

acquiring processing request information of a processing request for a first computer by a second computer, the first computer comprising a database server and the second computer comprising a batch server;

acquiring first operation information and second operation information that relate to operations of the first computer and the second computer, respectively, and storing the first operation information and the second operation information into a storage unit;

acquiring processing result information associating a processing history of the first computer according to the processing request included in the processing request information for the first computer with the second operation information that relates to the processing request by the second computer having made the processing request and storing the processing result information into the storage unit;

determining a type of the processing request based on the processing result information stored in the storage unit, the processing request information, and the first operation information and the second operation information stored in the storage unit;

determining whether or not issuance source process identification information of the processing request included in the processing request information is present in process information included in the first operation information acquired from the database server;

determining the type of the processing request to be a batch process of a particular type among batch processes performed by the batch server in a case where the issuance source process identification information of the processing request is present in the process information;

acquiring first address information of the batch server issuing the processing request of the batch process of the particular type based on the processing request information and the first operation information; and storing the first address information into the storage unit, wherein the process further comprises controlling resources that are allocated to the first and second computers based on a determination result of the type of the processing request.

2. The non-transitory computer-readable recording medium according to claim 1, wherein the process further comprises:

acquiring second address information of a server issuing the processing request based on the processing request information and the first operation information in a case where the issuance source process identification information of the processing request is not present in the process information;

acquiring, as the processing result information, a first resource usage amount from a start of previous processing according to a previous processing request to an end of the previous processing and a second resource usage amount from an end of the previous processing to a start of processing according to the processing request, from a server designated by the second address information;

determining whether or not the second resource usage amount increases with respect to the first resource usage amount;

determining the type of the processing request to be a remote batch process performed by the batch server in a case where the second resource usage amount increases with respect to the first resource usage amount; and storing the second address information in the storage unit as address information of the batch server.

3. The non-transitory computer-readable recording medium according to claim 2, wherein the process further comprises:

acquiring the second address information as address information of the application server in a case where the second resource usage amount does not increase with respect to the first resource usage amount;

detecting third address information of an issuance source server of the processing request based on the processing request information, the address information of the application server, and the first operation information acquired from the web server;

determining whether or not the third address information is stored in the storage unit; and determining the type of the processing request to be a web service batch process performed by the batch server through the web server in a case where the third address information is stored in the storage unit.

4. The non-transitory computer-readable recording medium according to claim 2, wherein the process further comprises determining the type of the processing request to be an online process in a case where the third address information is not stored in the storage unit.

5. A control apparatus comprising a processor executing instructions stored in a memory to provide:

a first acquisition unit configured to acquire processing request information of a processing request for a first computer by a second computer, the first computer comprising a database server and the second computer comprising a batch server;

a second acquisition unit configured to acquire first operation information and second operation information that relate to operations of the first computer and the second computers, respectively, and store the first operation information and the second operation information into the memory;

a determination unit configured to acquire processing result information associating a processing history of the first computer according to the processing request included in the processing request information for the first computer with the second operation information that relates to the processing request by the second computer having made the processing request and storing the processing result information into the memory, and determine a type of the processing request based on the processing result information stored in the memory, the processing request information, and the first operation information and the second operation information stored in the memory wherein the determination unit
determines whether or not issuance source process identification information of the processing request included in the processing request information is present in process information included in the first operation information acquired from the database server, determines the type of the processing request to be a batch process of a particular type among batch processes performed by the batch server in a case where the issuance source process identification information of the processing request is present in the process information, acquires first address information of the batch server issuing the processing request of the local batch process of the particular type based on the processing request information and the first operation information, and stores the first address information into the memory, and a resource control unit configured to control resources that are allocated to the first and second computers based on a determination result of the type of the processing request.

6. The control apparatus according to claim 5, wherein the determination unit acquires second address information of a server issuing the processing request using the second acquisition unit based on the processing request information and the first operation information in a case where the issuance source process identification information of the processing request is not present in the process information, acquires, as the processing result information, a first resource usage amount from a start of previous processing according to a previous processing request to an end of the previous processing and a second resource usage amount from an end of the previous processing to a start of processing according to the processing request, from a server designated by the second address information, determines whether or not the second resource usage amount increases with respect to the first resource usage amount, determines the type of the processing request to be a remote batch process performed by the batch server in a case where the second resource usage amount increases with respect to the first resource usage amount, and stores the second address information in the memory as address information of the batch server.

7. The control apparatus according to claim 6, wherein the determination unit acquires the second address information as address information of the application server in a case where the second resource usage amount does not increase with respect to the first resource usage amount, detects third address information of an issuance source server of the processing request based on the processing request information, the address information of the application server, and the first operation information acquired from the web server, determines whether or not the third address information is stored in the memory, and determines the type of the processing request to be a web service batch process performed by the batch server through the web server in a case where the third address information is stored in the memory.

8. The control apparatus according to claim 6, wherein the determination unit determines the type of the processing request to be an online process in a case where the third address information is not stored in the memory.

9. A control method executed by a processor, the control method comprising:

acquiring processing request information of a processing request for a first computer by a second computer, the first computer comprising a database server and the second computer comprising a batch server;

acquiring first operation information and second operation information that relate to operations of the first computer and the second computer, respectively, and storing the first operation information and the second operation information into a storage unit;

acquiring processing result information associating a processing history of the first computer according to the processing request included in the processing request information for the first computer with the second operation information that relates to the processing request by the second computer having made the processing request and storing the processing result information into the storage unit;

determining a type of the processing request based on the processing result information stored in the storage unit, the processing request information, and the first operation information and the second operation information stored in the storage unit;

determining whether or not issuance source process identification information of the processing request included in the processing request information is present in process information included in the first operation information acquired from the database server;

determining the type of the processing request to be a batch process of a particular type among batch processes performed by the batch server in a case where the issuance source process identification information of the processing request is present in the process information;

acquiring first address information of the batch server issuing the processing request of the batch process of the particular type based on the processing request information and the first operation information;

storing the first address information into the storage unit; and controlling resources that are allocated to the first and second computers based on a determination result of the type of the processing request.

10. The control method using the processor according to claim 9, the control method further comprising:

acquiring second address information of a server issuing the processing request based on the processing request information and the first operation information in a case where the issuance source process identification information of the processing request is not present in the process information;

acquiring, as the processing result information, a first resource usage amount from a start of previous processing according to a previous processing request to an end of the previous processing and a second resource usage amount, from an end of the previous processing to a start of processing according to the processing request from a server designated by the second address information;

determining whether or not the second resource usage amount increases with respect to the first resource usage amount;

determining the type of the processing request to be a remote batch process performed by the batch server in a case where the second resource usage amount increases with respect to the first resource usage amount; and storing the second address information in the storage unit as address information of the batch server.

11. The control method using the processor according to claim 10, the control method further comprising:

acquiring the second address information as address information of the application server in a case where the second resource usage amount does not increase with respect to the first resource usage amount;

detecting third address information of an issuance source server of the processing request based on the processing request information, the address information of the application server, and the first operation information acquired from the web server, determining whether or not the third address information is stored in the storage unit; and determining the type of the processing request to be a web service batch process performed by the batch server through the web server in a case where the third address information is stored in the storage unit.

12. The control method using the processor according to claim 10, the control method further comprising determining the type of the processing request to be an online process in a case where the third address information is not stored in the storage unit.

13. The non-transitory computer-readable recording medium according to claim 1, wherein the batch process of the particular type is a local batch process.

14. The control apparatus according to claim 5, wherein the batch process of the particular type is a local batch process.

15. The control method using the processor according to claim 9, wherein the batch process of the particular type is a local batch process.

\* \* \* \* \*